US009686438B2

(12) United States Patent
Kuwano et al.

(10) Patent No.: US 9,686,438 B2
(45) Date of Patent: Jun. 20, 2017

(54) IMAGE PROCESSING APPARATUS CONFIGURED TO PRINT IMAGE DATA AMONG MULTIPLE RECORDING SHEETS, IMAGE PROCESSING SYSTEM, IMAGE PROCESSING METHOD, AND RECORDING MEDIUM CONFIGURED TO PERFORM SAME

(71) Applicants: Shuko Kuwano, Kanagawa (JP); Yutaka Matsumura, Kanagawa (JP); Taku Yamawaki, Tokyo (JP)

(72) Inventors: Shuko Kuwano, Kanagawa (JP); Yutaka Matsumura, Kanagawa (JP); Taku Yamawaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/845,557

(22) Filed: Sep. 4, 2015

(65) Prior Publication Data
US 2016/0080605 A1 Mar. 17, 2016

(30) Foreign Application Priority Data
Sep. 17, 2014 (JP) .................................. 2014-188791

(51) Int. Cl.
*G06K 15/00* (2006.01)
*H04N 1/387* (2006.01)
*H04N 1/00* (2006.01)

(52) U.S. Cl.
CPC ....... *H04N 1/3876* (2013.01); *H04N 1/00702* (2013.01); *H04N 1/387* (2013.01); *H04N 1/3877* (2013.01); *H04N 2201/0094* (2013.01)

(58) Field of Classification Search
CPC combination set(s) only.
See application file for complete search history.

(56) References Cited

U.S. PATENT DOCUMENTS

| 8,582,169 | B2 * | 11/2013 | Watanabe | .......... G06K 15/1825 |
| | | | | 358/1.18 |
| 2001/0019423 | A1 * | 9/2001 | Hirai | ...................... G06K 15/02 |
| | | | | 358/1.15 |

(Continued)

FOREIGN PATENT DOCUMENTS

JP 11-069139 3/1999

*Primary Examiner* — Henok A Shiferaw
(74) *Attorney, Agent, or Firm* — Harness, Dickey & Pierce, P.L.C.

(57) ABSTRACT

An image processing apparatus, an image processing system, and an image processing method, are provided, each of which receives a user instruction for printing an image on a plurality of recording sheets with an addition image being added to the image at a preset position in the image; generates a plurality of items of image data to be formed on the plurality of recording sheets so as to obtain the image when the plurality of recording sheets are pasted together; determines a specific recording sheet of the plurality of recording sheets and a specific position on the specific recording sheet, based on the preset position of the addition image, a number of the plurality of recording sheets for forming the image, and an image forming direction in forming the image on the plurality of recording sheets; and adds the addition image to an item of image data corresponding to the determined recording sheet at the specific position on the specific recording sheet.

17 Claims, 22 Drawing Sheets

(56) References Cited

U.S. PATENT DOCUMENTS

| | | | |
|---|---|---|---|
| 2006/0050290 A1* | 3/2006 | Kondo | H04N 1/00278 |
| | | | 358/1.13 |
| 2011/0102853 A1* | 5/2011 | Makishima | H04N 1/00864 |
| | | | 358/3.28 |
| 2013/0258361 A1* | 10/2013 | Qian | G06K 15/02 |
| | | | 358/1.9 |
| 2014/0071343 A1* | 3/2014 | Mizuno | H04N 21/4314 |
| | | | 348/468 |

* cited by examiner

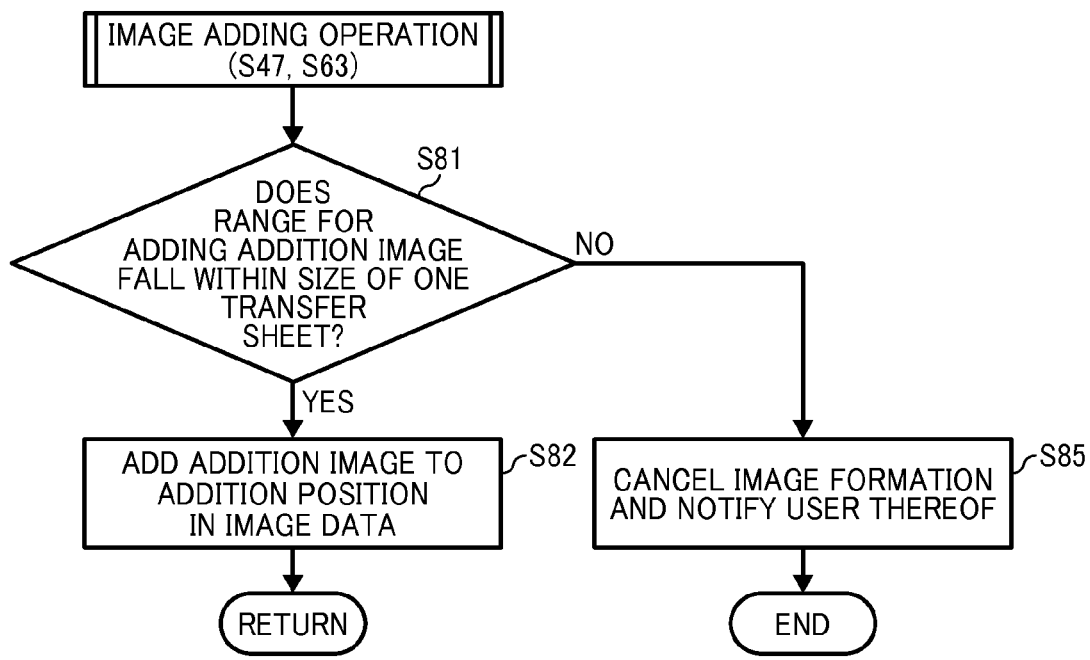

FIG. 25
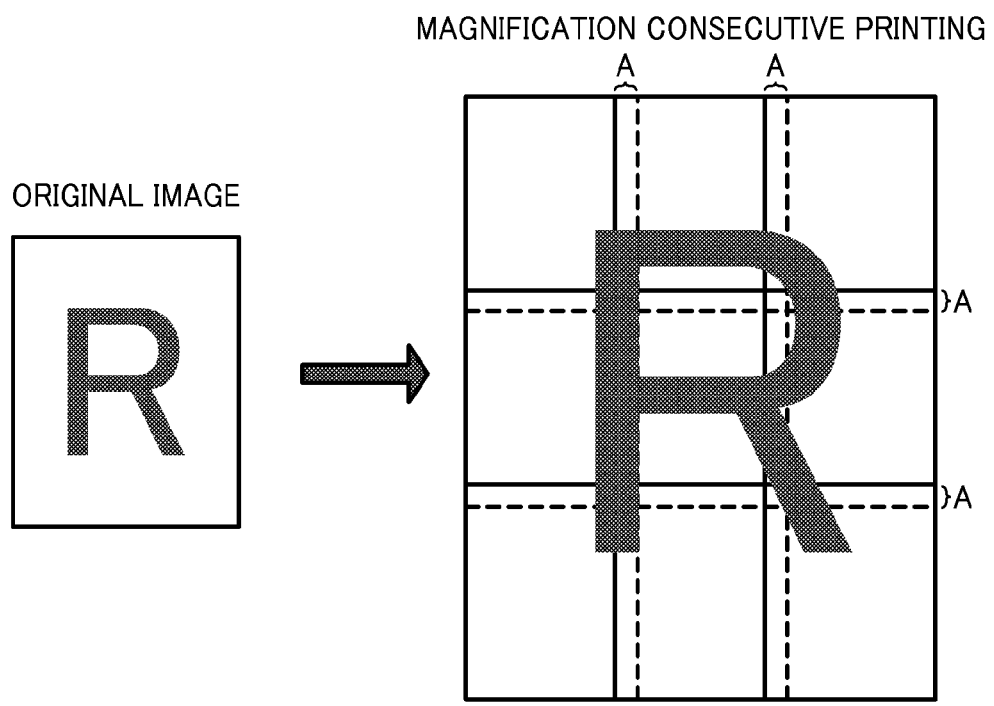
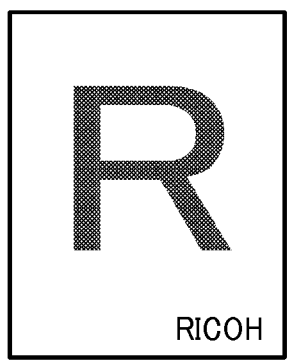
FIG. 26A
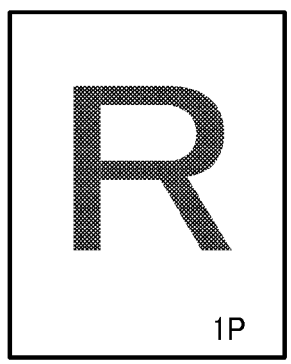
FIG. 26B
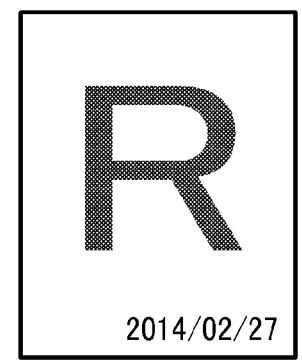
FIG. 26C

IMAGE PROCESSING APPARATUS CONFIGURED TO PRINT IMAGE DATA AMONG MULTIPLE RECORDING SHEETS, IMAGE PROCESSING SYSTEM, IMAGE PROCESSING METHOD, AND RECORDING MEDIUM CONFIGURED TO PERFORM SAME

CROSS-REFERENCE TO RELATED APPLICATIONS

This patent application is based on and claims priority pursuant to 35 U.S.C. §119(a) to Japanese Patent Application No. 2014-188791, filed on Sep. 17, 2014, in the Japan Patent Office, the entire disclosure of which is hereby incorporated by reference herein.

BACKGROUND

Technical Field

The present invention relates to an image processing apparatus, an image processing system, an image processing method, and a recording medium.

Description of the Related Art

In an image forming apparatus, the following function is known, namely, the function of dividing image data obtained by reading a document into a plurality of items of image data, magnifying each of the items of data, and separately printing and outputting the magnified items of image data on a plurality of transfer sheets while having margins for pasting on the transfer sheets. The user can obtain one large print output by pasting the output transfer sheets together at margins A, as illustrated in FIG. 25. Such an output function is referred to as magnification consecutive printing.

Apart from this, the function of adding a user-designated image to a user-designated position on an image to be printed and printing the image with the added user-designated image is also known. FIGS. 26A to 26C illustrate examples in which an image is added in the lower right-hand corner. There are various images to be added, such as a user name as illustrated in FIG. 26A, a page number as illustrated in FIG. 26B, and a date as illustrated in FIG. 26C.

In the case of using the above-mentioned magnification consecutive printing function and image adding function in combination, an output may have an unnatural appearance if the two functions are simply combined. For example, when an image is added over the position of a margin provided in magnification consecutive printing, if transfer sheets are pasted together, part of the added image becomes hidden.

SUMMARY

Example embodiments of the present invention include an image processing apparatus, an image processing system, and an image processing method, each of which receives a user instruction for printing an image on a plurality of recording sheets with an addition image being added to the image at a preset position in the image; generates a plurality of items of image data to be formed on the plurality of recording sheets so as to obtain the image when the plurality of recording sheets are pasted together; determines a specific recording sheet of the plurality of recording sheets and a specific position on the specific recording sheet, based on the preset position of the addition image, a number of the plurality of recording sheets for forming the image, and an image forming direction in forming the image on the plurality of recording sheets; and adds the addition image to an item of image data corresponding to the determined recording sheet at the specific position on the specific recording sheet.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 23 is a flowchart illustrating an operation that replaces the operation illustrated in FIG. 16, in a sixth example of the image forming operation;

FIG. 24 is a diagram illustrating an example of the relationship between magnification ratios and font sizes;

FIG. 25 is a diagram for describing a magnification consecutive printing function; and FIGS. 26A to 26C (FIG. 26) are diagrams for describing an image adding function.

Figure 1:
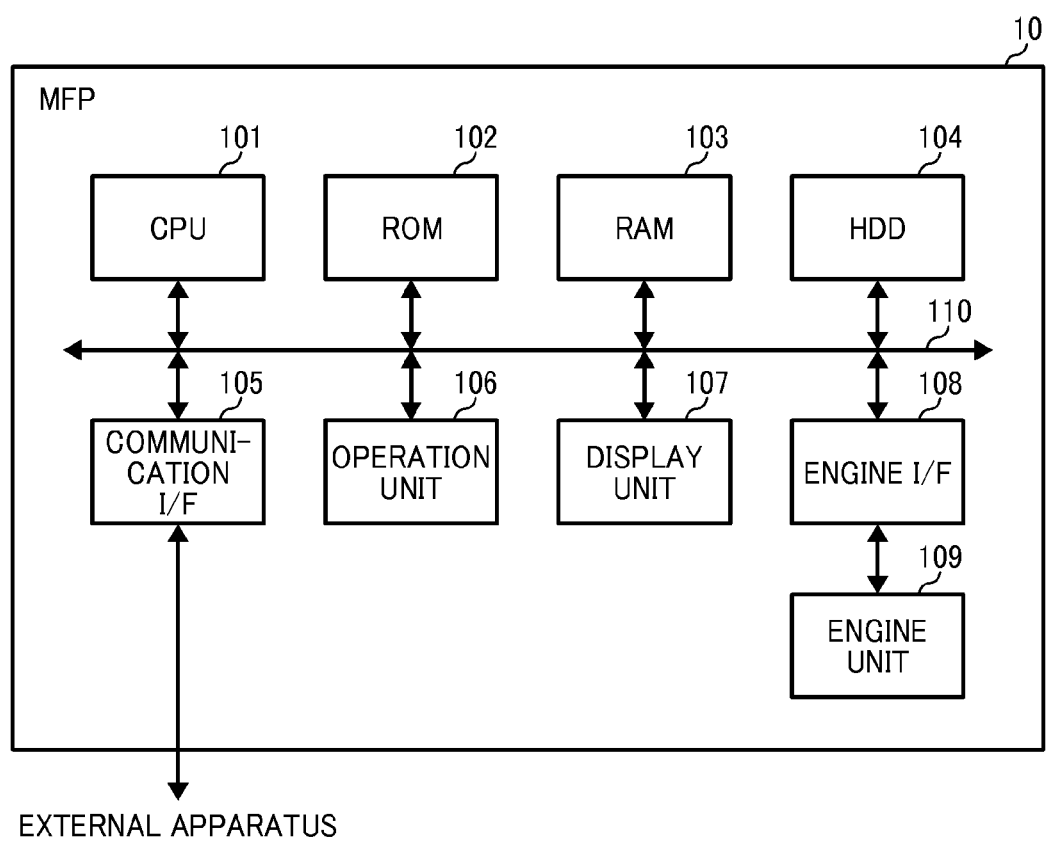
FIG. 1 is a diagram illustrating the hardware configuration of a multifunction peripheral (MFP) serving as an embodiment of an image processing apparatus and an image processing system according to the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Hereinafter, a preferred exemplary embodiment of the present invention will be described in detail with reference to the attached drawings. Since the following embodiment is a preferred exemplary embodiment of the present invention, various technically preferred limitations are added thereto. However, the scope of the present invention is not construed to be limited by the following description, and not all configurations described in the embodiment are essential elements of the present invention.

Hereinafter, an embodiment of the present invention will be described with reference to the drawings.

FIG. 1 illustrates the hardware configuration of a multi-function peripheral (MFP) that is an embodiment of an image processing apparatus and an image processing system according to the present invention.

An MFP 10 includes an image reader and an image forming device. The image reader reads an image of a document into image data, such as a scanner. The image forming device forms an image on a recording sheet, such as a transfer sheet, on the basis of the image data. The MFP 10 is an image processing apparatus that implements various functions including copying, printing, scanning, facsimile communication, document accumulation, and so forth. A recording sheet may be a sheet or film made of resin.

As illustrated in FIG. 1, the MFP 10 has a CPU 101, a read-only memory (ROM) 102, a random-access memory (RAM) 103, a hard disk drive (HDD) 104, a communication interface (I/F) 105, an operation unit 106, a display unit 107, and an engine I/F 108 as hardware components, and these hardware components are connected by a system bus 110. An engine unit 109 is connected to the engine I/F 108.

By executing a program stored in the ROM 102 or the HDD 104 while having the RAM 103 as a work area, the CPU 101 controls the entire MFP 10 and implements various functions including a magnification consecutive printing function and an image adding function, which will be described later.

The ROM 102 and the HDD 104 are non-volatile storage media (memories) and store various programs executed by the CPU 101 and various types of data, which will be described later.

The communication I/F 105 an interface for communicating with another apparatus via a communication channel such as a network. It is only necessary to provide an interface that conforms to the standards of a communication channel to use.

The operation unit 106 is an operation unit for accepting a user instruction. The operation unit 106 includes various keys, various switches, and a touch screen, and the operation unit 106 can accept an operation performed on a graphical user interface (GUI) displayed by the display unit 107 as the user instruction.

The display unit 107 presents, besides the above-mentioned GUI, the operating state of the MFP 10, the setting details of the MFP 10, and a message to the user, and includes a liquid crystal display and a lamp.

The engine I/F 108 is an interface for connecting the engine unit 109 to the system bus 110 so as to enable the CPU 101 to control the engine I/F 108. In addition, the engine unit 109 is a module for implementing functions including mechanical movements, such as the above-mentioned image forming device and image reader.

In the following, operation of generating image data corresponding to each recording sheet in the case of using the magnification consecutive printing function and the image adding function in combination is described. The magnification consecutive printing function divides an image according to image data into partial images and forms the partial images on a plurality of recording sheets so as to obtain the image according to the image data when the recording sheets are pasted together. The image adding function adds an addition image to a desired position and forms the image with the addition image.

More specifically, in the case of dividing an image according to image data into partial images and forming the partial images on a plurality of recording sheets so as to obtain the image according to the image data when the recording sheets are pasted together, it is desired to generate image data that has a natural finish even in the case where another image is added and the image with the added image is generated.

Before explaining image forming operation using the magnification consecutive printing function and the image adding function in combination, the operation of the MFP 10 in the case of separately using the magnification consecutive printing function and the image adding function will be described. In the following example, the case of forming an image on the basis of image data obtained by reading a document will be described. Needless to say, similar image formation is possible on the basis of image data that has been generated in advance by reading a document and saved in another device.

First, an operation executed by the CPU 101 of the MFP 10 in the case of forming an image using the magnification consecutive printing function will be described, referring to FIG. 2.

Figure 2:
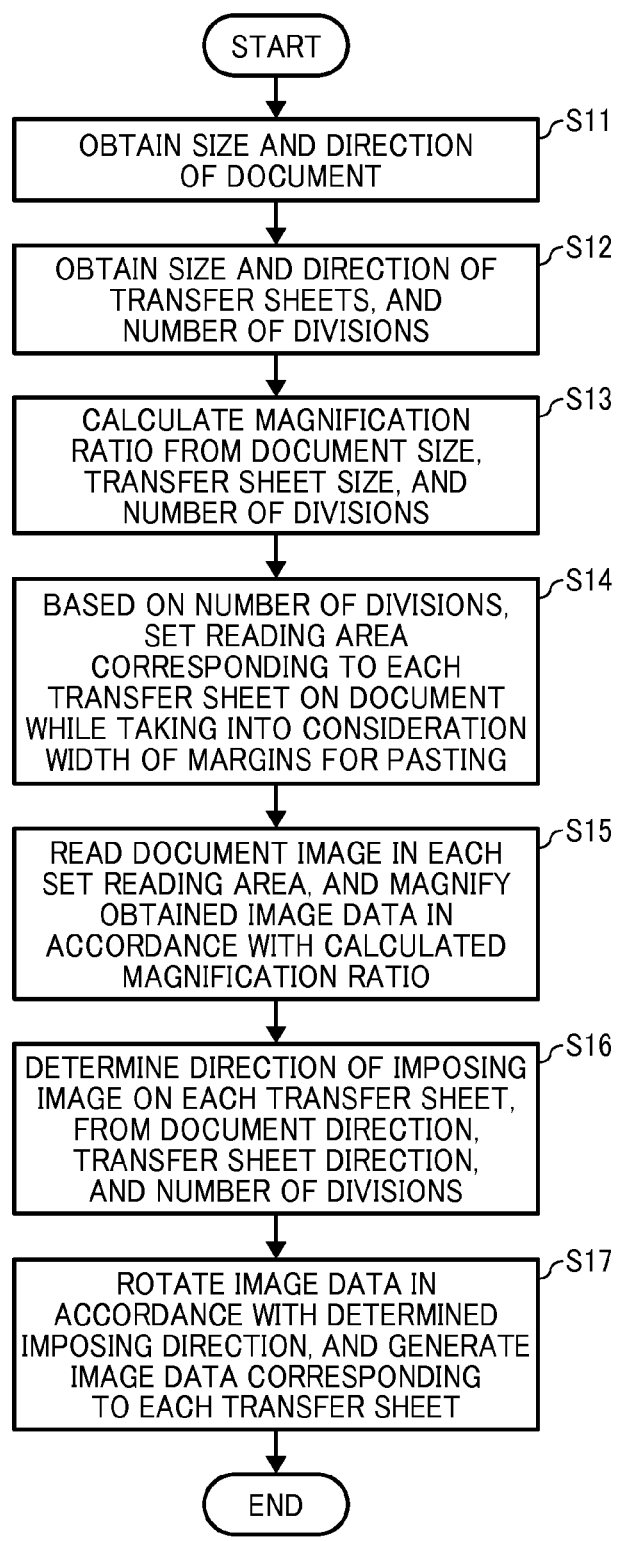
FIG. 2 is a flowchart of an operation executed by a central processing unit (CPU) of the MFP illustrated in FIG. 1 in the case of forming an image using a magnification consecutive printing function.

The CPU 101 of the MFP 10 starts the operation illustrated in FIG. 2 in response to an instruction to execute image formation using the magnification consecutive printing function in a state where a document is placed on a document table. Before using the magnification consecutive printing function, the user sets, using the operation unit 106, for example, the size and direction (an image forming direction indicating in which direction an image is to formed) of transfer sheets to use, and the number of divisions into which the original image is divided and formed in accordance with the number of transfer sheets. In alternative to the operation unit 106, the user may set the size and direction of the document, using a client apparatus of the user such as a PC. When the user does not set any of these values, the CPU 101 automatically sets certain default values.

In the operation illustrated in FIG. 2, the CPU 101 obtains the size and direction of a placed document, which is set by the user through the operation unit 106 (S11). The CPU 101 also obtains the set size and direction of transfer sheets, and the set number of divisions, which is set by the user through the operation unit 106 (S12). From the document size, the transfer sheet size, and the number of divisions, the CPU 101 calculates a magnification ratio (S13).

For example, when the transfer sheet size is W cm in width, H cm in height, and S cm in margin for pasting (common in width and height), and the number of divisions is N×N, the size of an output obtained by pasting N×N transfer sheets is (W−S×(N−1)) cm in width and (H−S×(N−1)) cm in height. Therefore, a magnification ratio is simply calculated by comparing the original document size with this output size. Alternatively, a magnification ratio may be calculated without taking the margins for pasting into consideration.

Next, the CPU 101 sets a reading area corresponding to each transfer sheet on the document while taking into consideration the width of margins for pasting the transfer sheets, on the basis of the number of divisions (S14).

Figure 3:
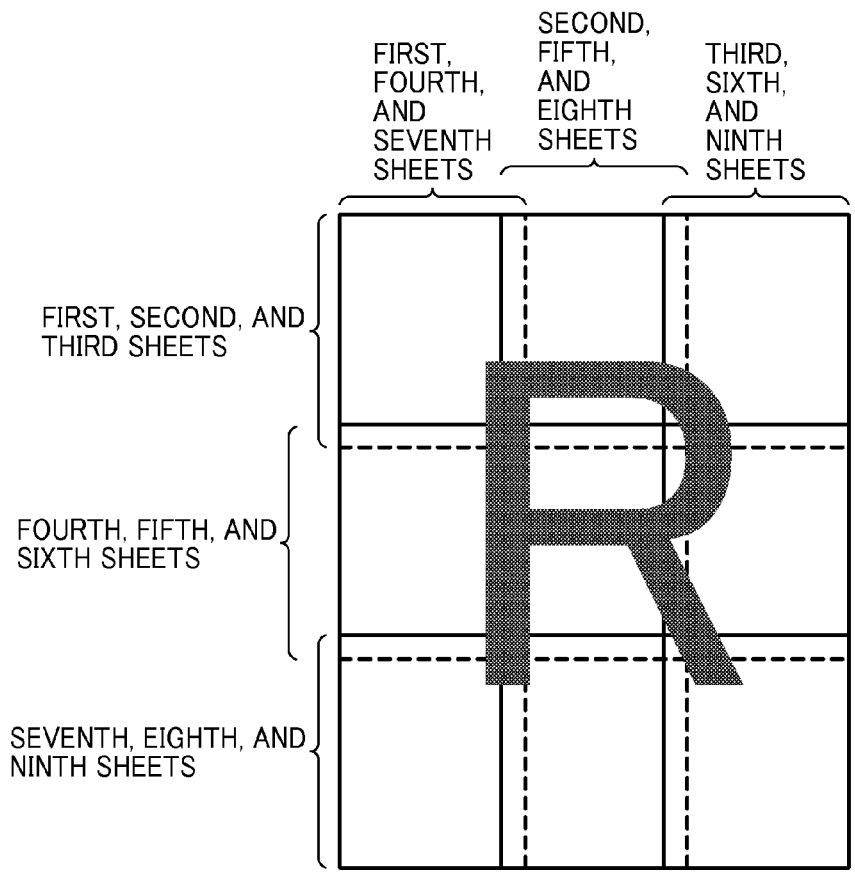
FIG. 3 is a diagram illustrating an exemplary setting of reading areas in the case of 3×3 division.

FIG. 3 illustrates an exemplary setting of the case in which a reading area in the case of 3×3 division is set on the first sheet, the second sheet, and so forth from the upper left-hand corner to the right. Because of the margins for pasting, as illustrated in FIG. 3, part of reading areas corresponding to transfer sheets is set in an overlapping manner. Images in these overlapping portions are formed on a plurality of transfer sheets.

Figure 4:
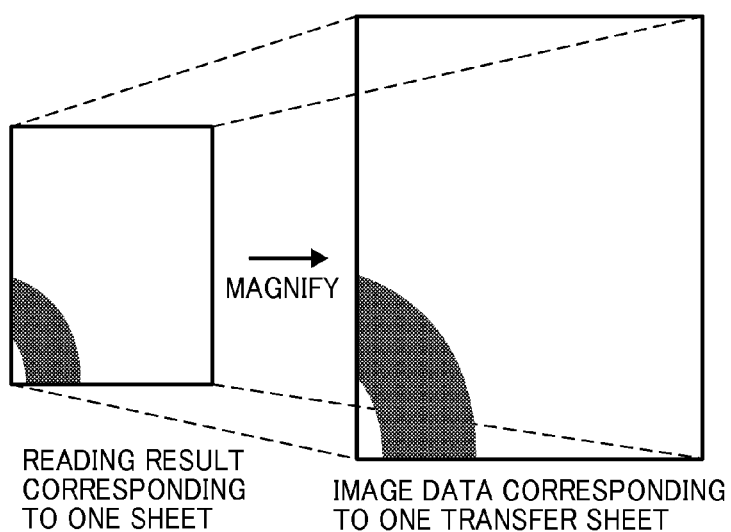
FIG. 4 is a diagram illustrating an example of magnification of image data.

Referring back to FIG. 2, the CPU 101 reads an image of a document in each reading area set in step S14, and magnifies the obtained image data in accordance with the magnification ratio calculated in step S13, as illustrated in FIG. 4 (S15). In this case, reading may be performed N×N times in accordance with respective reading areas, or portions corresponding to the respective reading areas may be cut out from an image obtained by one reading operation.

In addition, the CPU 101 determines the direction of imposing an image on each transfer sheet, from the document direction, the transfer sheet direction, and the number of divisions (S16). This operation determines the angle of rotation, such as rotating the document image 90 degrees or 270 degrees and forming the image on a transfer sheet if the document is vertically long, and the size of an output obtained by pasting transfer sheets, the number of which is the number of divisions, is horizontally long.

Thereafter, the CPU 101 rotates the image data obtained in step S15 in accordance with the imposing direction determined in step S16, and generates image data corresponding to each transfer sheet (S17).

After the operation of generating image data as illustrated in FIG. 2 ends, the CPU 101 functions as a controller to control the image forming device on the basis of the generated image data, and forms an image on each transfer sheet. Consequently, images can be formed on a plurality of transfer sheets so as to obtain a magnified image of an image of a document when the plurality of transfer sheets are pasted together. In the operation illustrated in FIG. 2, the CPU 101 functions as an image processor.

Next, an operation executed by the CPU 101 of the MFP 10 in the case of forming an image using the image adding function will be described, referring to FIG. 5.

Figure 5:
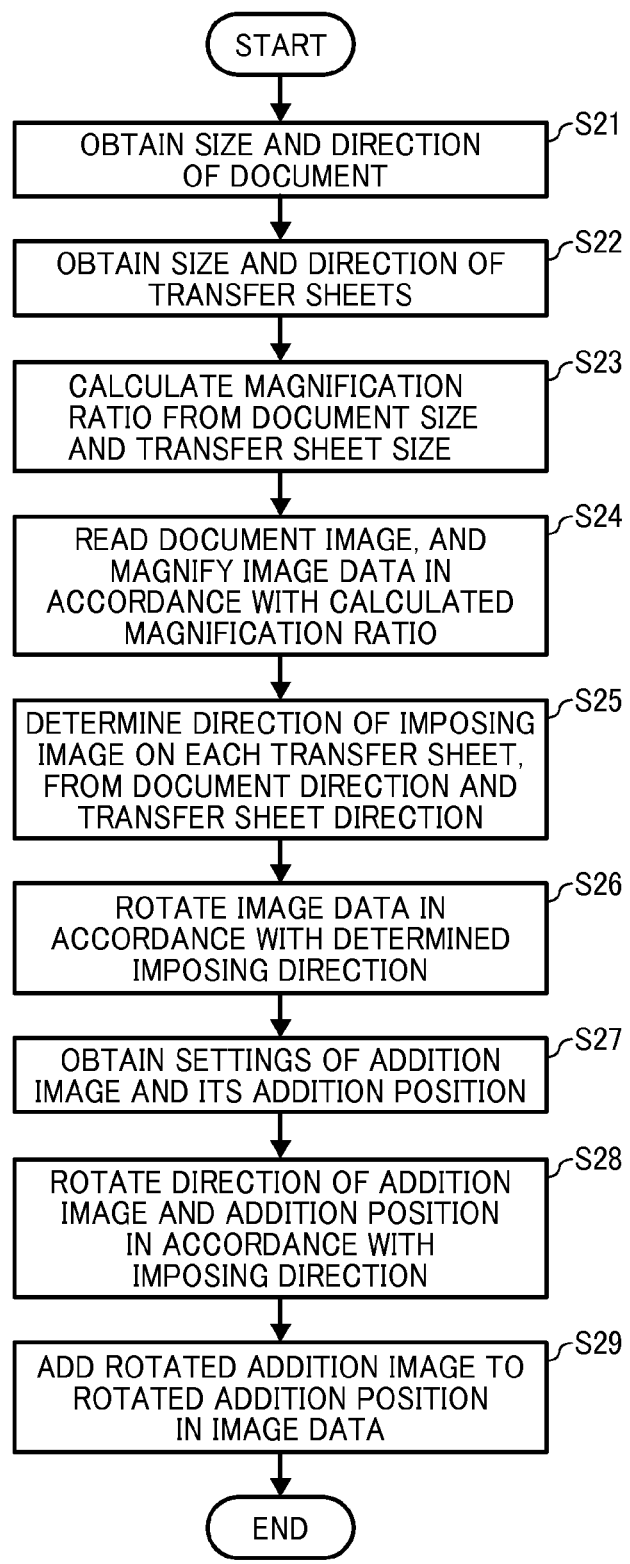
FIG. 5 is a flowchart of an operation executed by the CPU of the MFP illustrated in FIG. 1 in the case of forming an image using an image adding function.
Figure 6:
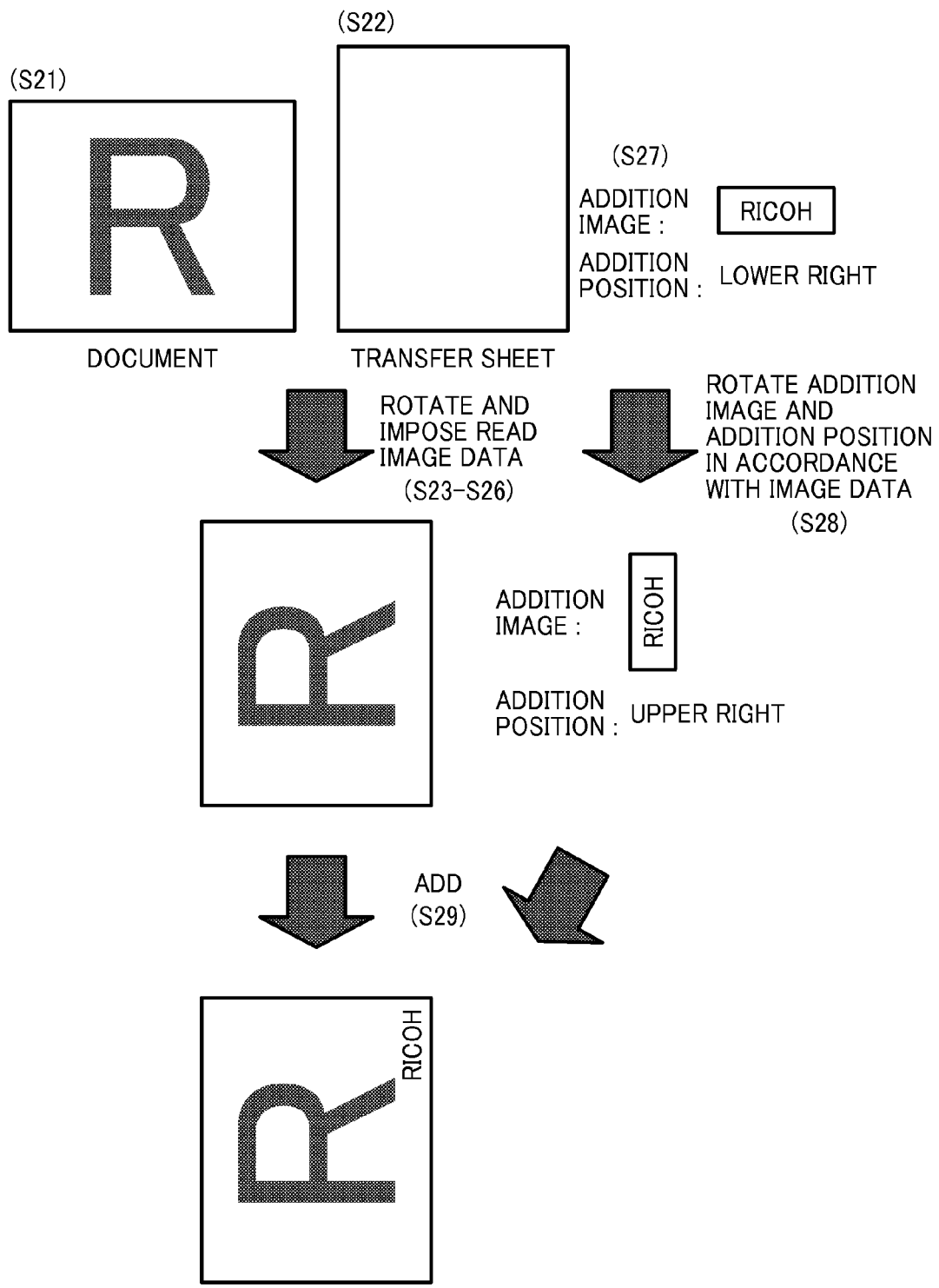
FIG. 6 is a diagram that schematically illustrates the details of operation in each step illustrated in FIG. 5.

FIG. 6 is a diagram that schematically illustrates the details of operation in each step of this flowchart. Note that the operation illustrated in FIG. 5 discusses the case of simultaneously performing sheet-designated magnification, which is magnification and rotation, of an image of a document in accordance with the size and direction of transfer sheets to use. Before using the image adding function, it is assumed to set an addition image to be added to the document image, and its addition position. When the user does not set any of these values, the CPU 101 automatically sets certain default values.

In the operation illustrated in FIG. 5, the CPU 101 obtains the size and direction of a placed document, which may be set by the user using the operation unit 106 (S21). The CPU 101 also obtains the set size and direction of transfer sheets, which may be set by the user using the operation unit 106 (S22). From the document size and the transfer sheet size, the CPU 101 calculates a magnification ratio (S23).

Next, the CPU 101 reads an image of the document, and magnifies the obtained image data in accordance with the magnification ratio calculated in step S23 (S24). In addition, the CPU 101 determines the direction of imposing an image on each transfer sheet, from the document direction and the transfer sheet direction (S25). This operation determines the angle of rotation, such as rotating the document image 90 degrees or 270 degrees and forming the image on a transfer sheet if the document is vertically long and the transfer sheets are horizontally long.

Thereafter, the CPU 101 rotates the image data obtained in step S24 in accordance with the imposing direction determined in step S25, and generates image data of an image to be formed on each transfer sheet (S26).

Next, the CPU 101 obtains the settings of the addition image and its addition position (S27). The CPU 101 also rotates the addition image and the addition position in accordance with the imposing direction determined in step S25 (S28), and adds the rotated addition image to the rotated addition position, which are obtained in step S28, in the rotated image data obtained in step S26 (S29). This addition may be performed by performing an OR operation for each pixel, instead of performing simple overwriting. In the case where the addition image is an image of a character string, it is preferred to maintain the details of image data before the addition in a portion where there are no characters.

After the operation of generating image data as illustrated in FIG. 5 ends, the CPU 101 controls the image forming device on the basis of the generated image data, and forms an image on each transfer sheet. Consequently, an arbitrary addition image can be added to an image obtained by reading a document, and an image can be formed on each transfer sheet.

Next, an exemplary screen for the MFP 10 to accept settings regarding the above-described magnification consecutive printing function and image adding function will be discussed.

Figure 7:
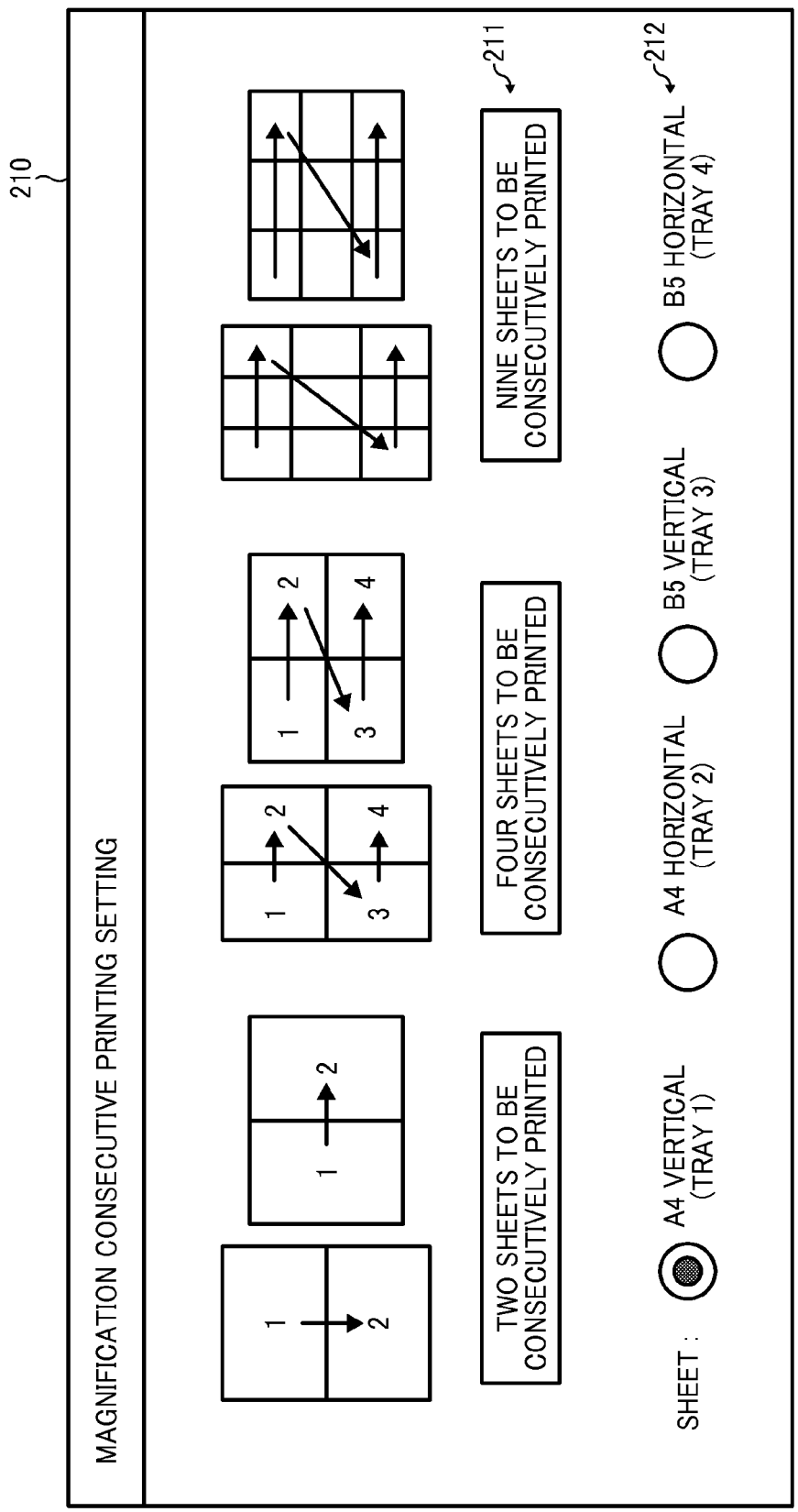
FIG. 7 is a diagram illustrating an example of a magnification consecutive printing setting screen.

FIG. 7 is a diagram illustrating an example of a magnification consecutive printing setting screen for accepting settings regarding the magnification consecutive printing function.

A magnification consecutive printing setting screen 210 is a screen displayed on the display unit 107 in response to an instruction given from the user, and includes a number-of-division setter 211 and a transfer sheet setter 212.

The number-of-division setter 211 is an area for setting the above-described number of divisions, and is capable of selecting the number of divisions in response to operating a key corresponding to each number of sheets. Figures above each key represent the order of forming images. Alternatively, the numbers of divisions other than those illustrated in FIG. 7 may be set.

The transfer sheet setter 212 is an area for setting the size and direction of transfer sheets, and is capable of selecting one of choices corresponding to paper feed trays included in the MFP 10 by selecting a corresponding radio button. The direction of transfer sheets is an orientation of the recording sheet when stored in the paper feed tray, such that it affects the direction in forming an image on the recording sheet. Alternatively, an arbitrary size and direction may be set by using a manual paper feed tray or the like.

Figure 8:
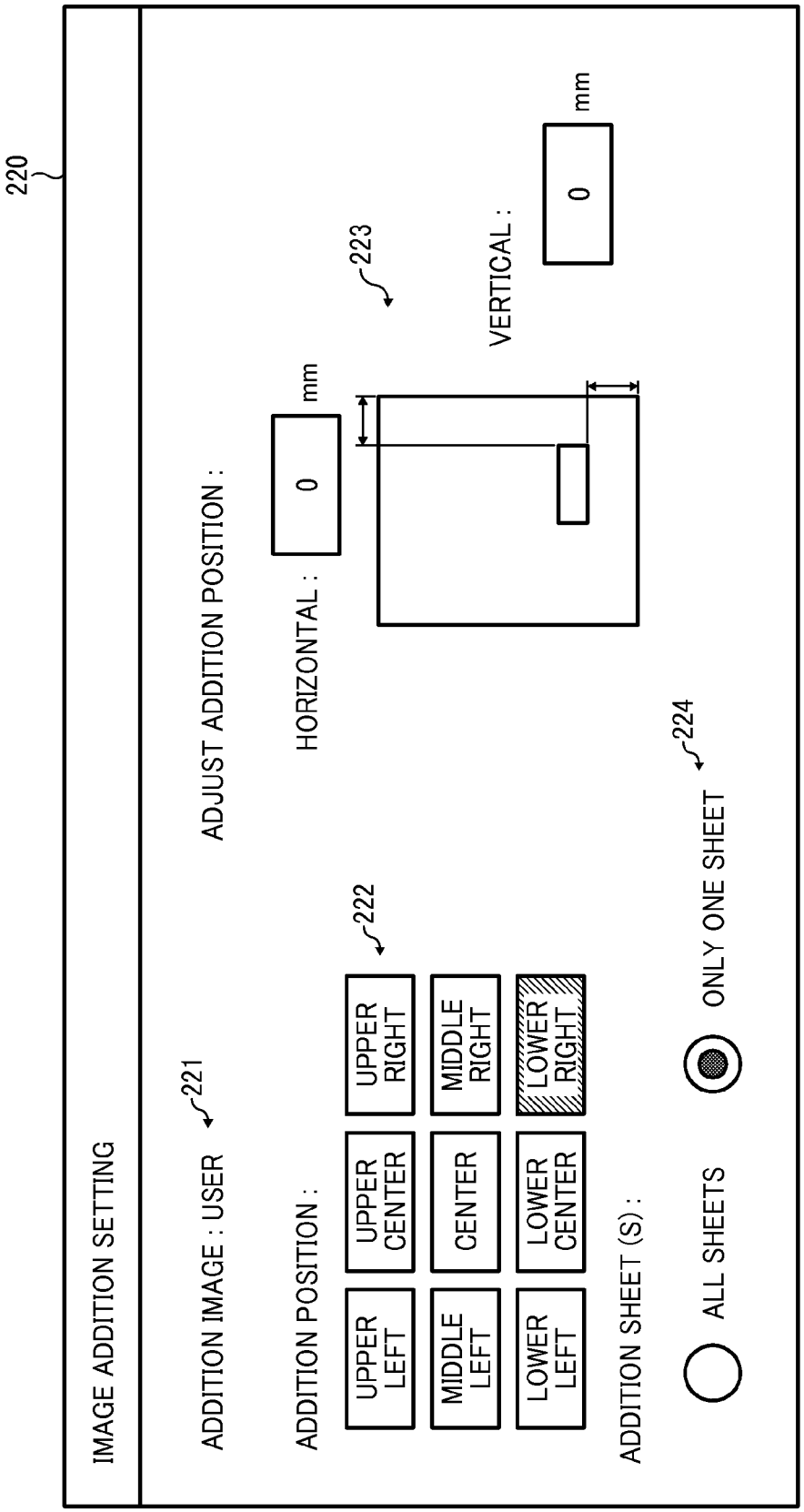
FIG. 8 is a diagram illustrating an example of an image addition setting screen.

FIG. 8 is a diagram illustrating an example of an image addition setting screen for accepting settings regarding the image adding function.

An image addition setting screen 220 is also a screen displayed on the display unit 107 in response to an instruction given from the user, and includes an addition image display portion 221, an addition position setter 222, an addition position adjuster 223, and an addition sheet setter 224. The image addition setting screen 220 may be displayed, for example, after the magnification consecutive printing setting screen 210.

The addition image display portion 221 is an area displaying an addition image that has been set on a different screen, or the name of that addition image. FIG. 8 illustrates an example in which the setting has been made to add a character string of a user name.

The addition position setter 222 is an area for setting a rough position to add the addition image to the image to be printed by selecting a key corresponding to each position. FIG. 8 illustrates an example in which the lower right-hand corner has been set as a position to add the addition image.

The addition position adjuster 223 is an area for setting a distance from the sheet edge to the addition position, and for performing minor adjustment of the addition position.

The addition sheet setter 224 is an area for setting whether to add the addition image to all transfer sheets or to only one transfer sheet. In the case of simultaneously using the magnification consecutive printing function and the image adding function, the setting to add the addition image to all sheets means that the addition image is added to a position corresponding to the addition position set by the addition position setter 222 and the addition position adjuster 223 on each of all transfer sheets, the number of which is the number of divisions. The setting to add the addition image to only one sheet means that the addition image is added to an image formed on one transfer sheet such that the addition image will be at a position corresponding to the addition position set by the addition position setter 222 and the addition position adjuster 223, in the entirety of the image when a plurality of transfer sheets are pasted together.

Hereinafter, a few examples of an image forming operation executed by the MFP 10 in accordance with the settings made on the screens illustrated in FIGS. 7 and 8 will be described. The MFP 10 may execute only one of the operations described below, or may execute a plurality of operations by switching one to another in accordance with some kind of settings.

Figure 9:
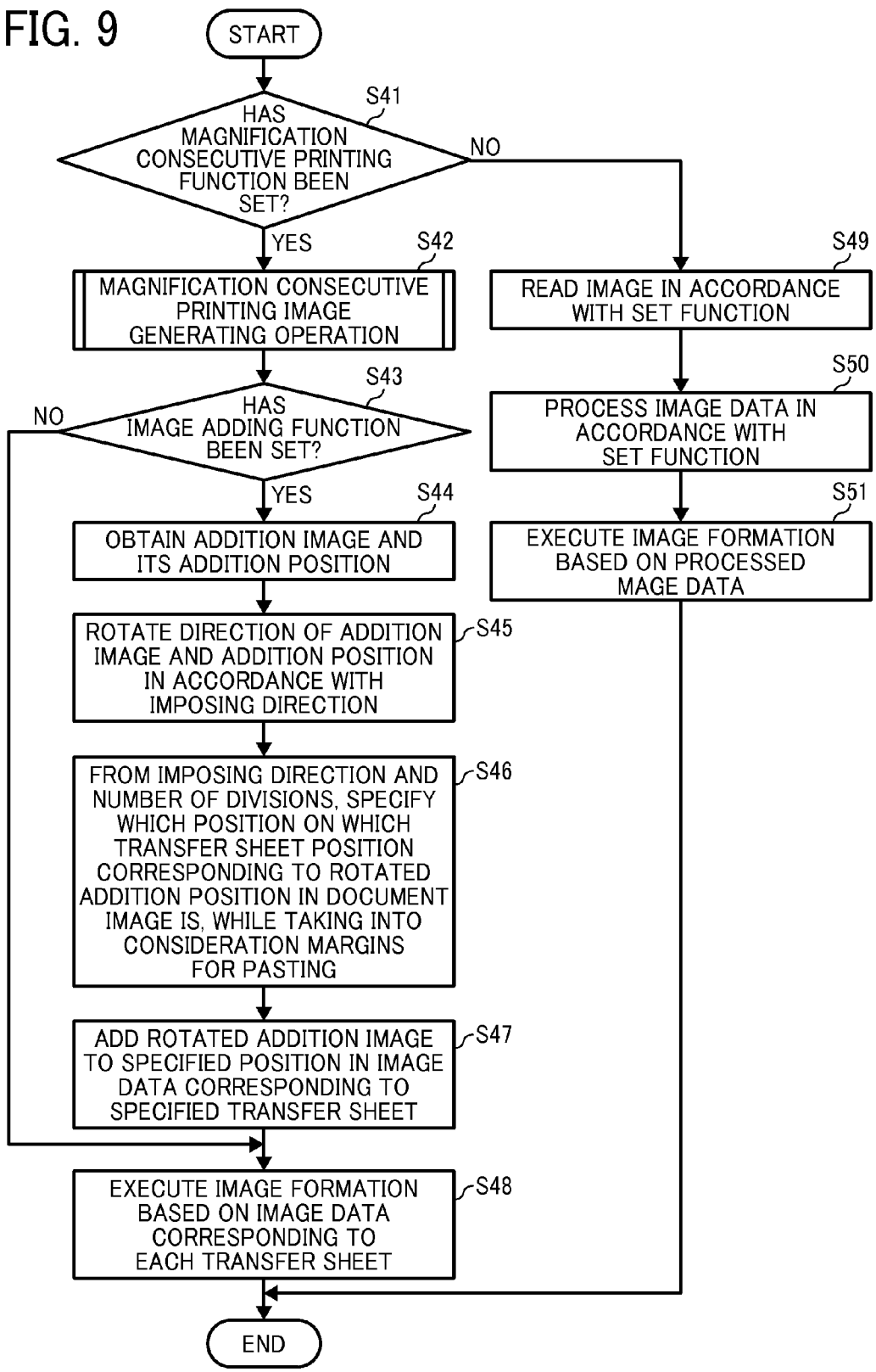
FIG. 9 is a flowchart illustrating a first example of an image forming operation executed by the CPU of the MFP illustrated in FIG. 1.
Figure 10:
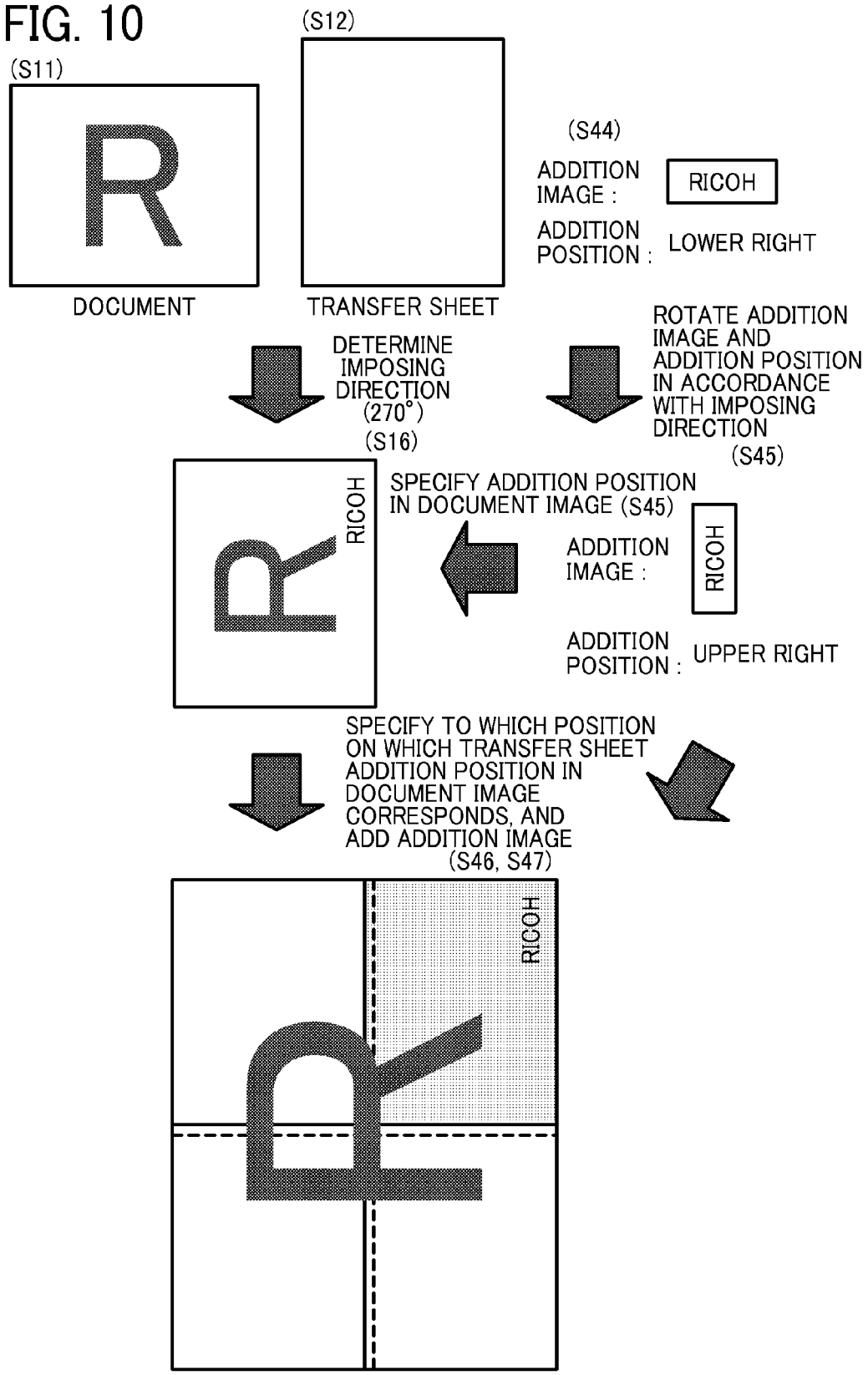
FIG. 10 is a diagram that schematically illustrates the details of operation in each step illustrated in FIG. 9.

FIG. 9 illustrates a first example of an image forming operation executed by the CPU 101 of the MFP 10. FIG. 10 schematically illustrates the details of operation in each step of this flowchart. In the first example, it is assumed that there is no addition sheet setter 224 in the image addition setting screen 220, such that the addition image is assumed to be added to only one sheet by default.

The CPU 101 of the MFP 10 starts the operation illustrated in FIG. 9 in response to an instruction to execute image formation.

Firstly, the CPU 101 determines whether the magnification consecutive printing function has been set (S41), and, if not, reads an image (S49) and processes image data (S50) in accordance with other functions that have been set, and executes image formation on the basis of the image data obtained as a result thereof (S51). The detailed description of the operation in these steps are omitted.

In contrast, if it is determined in step S41 that the magnification consecutive printing function has been set, the CPU 101 generates image data corresponding to each transfer sheet by performing the magnification consecutive printing image generating operation illustrated in FIG. 2 (S42).

Thereafter, the CPU 101 determines whether the image adding function has been set (S43). If the determination is NO, it is unnecessary to further process the image data. Therefore, the CPU 101 executes image formation on each transfer sheet on the basis of the generated image data (S48), and ends the operation. An output result in this case is simple magnification consecutive printing such as that illustrated in FIG. 3. Note that performing processing in accordance with other functions that are not taken into consideration here is not precluded.

In contrast, if the determination is YES in step S43, the CPU 101 proceeds to the operation regarding image addition in step S44 onward. Firstly, the CPU 101 obtains the settings of the addition image and its addition position (S44), and rotates the addition image and the addition position in accordance with the imposing direction determined in step S16 in FIG. 2 (S45). Thereafter, the CPU 101 specifies, from the imposing direction and the number of divisions, while taking into consideration the margins for pasting, a specific position on a specific transfer sheet that corresponds to the rotated addition position in the document image (S46).

More specifically, the imposing direction is determined based on the document direction, the transfer sheet direction, and the number of divisions as described referring to S16. The rotation angle of the addition image is determined based on the imposing direction as described referring to S28. Further, the CPU 101 specifies a recording sheet to be added with the addition image and a specific position of the addition image on that recording sheet, using the imposing direction and the number of divisions, when the recording sheets are pasted together. As the specific position on the specific recording sheet is determined before adding the addition image, the addition image is added to a right position on the entire image.

For example, as illustrated in FIG. 10, it is assumed that the set addition position is the lower right-hand corner, four recording sheets are to be printed, and the direction (orientation) of the transfer sheet is vertical. In such case, the addition position is rotated in step S45 and changed to the upper right-hand corner. Accordingly, regarding the distance from the sheet edge, the distance from the right edge is replaced by the distance from the upper edge, and the distance from the lower edge is replaced by the distance from the right edge. From these items of information, in the case of forming images on four transfer sheets in the order of the upper left, upper right, lower left, and lower right as illustrated in FIG. 7, it can be specified that the addition image is to be added to the upper right-hand corner of the transfer sheet to be printed second (second transfer sheet) corresponding to the upper right of the entire document image.

The CPU 101 adds the addition image, which has been rotated in step S45, to the position specified in step S46, in image data corresponding to the transfer sheet specified in step S46 (S47), and ends the operation regarding the image addition. This addition operation can be performed in the same manner as the case of step S29 illustrated in FIG. 5 except for the addition position.

On the basis of the image data generated so far, the CPU 101 executes image formation on each transfer sheet (S48), and ends the operation illustrated in FIG. 9.

In the above operation, the CPU 101 functions as an addition image obtainer in step S44, and as an image adder in steps S45 to S47.

According to the above operation, the MFP 10 can add an addition image to a specific position on a specific transfer sheet of a plurality of transfer sheets to be printed, such that, when the transfer sheets are pasted to form the entire document image thereon, the addition image is printed at a position corresponding to an addition position instructed by the user. Therefore, an image with a natural finish can be obtained even when the magnification consecutive printing function and the image adding function are simultaneously used.

Figure 11:
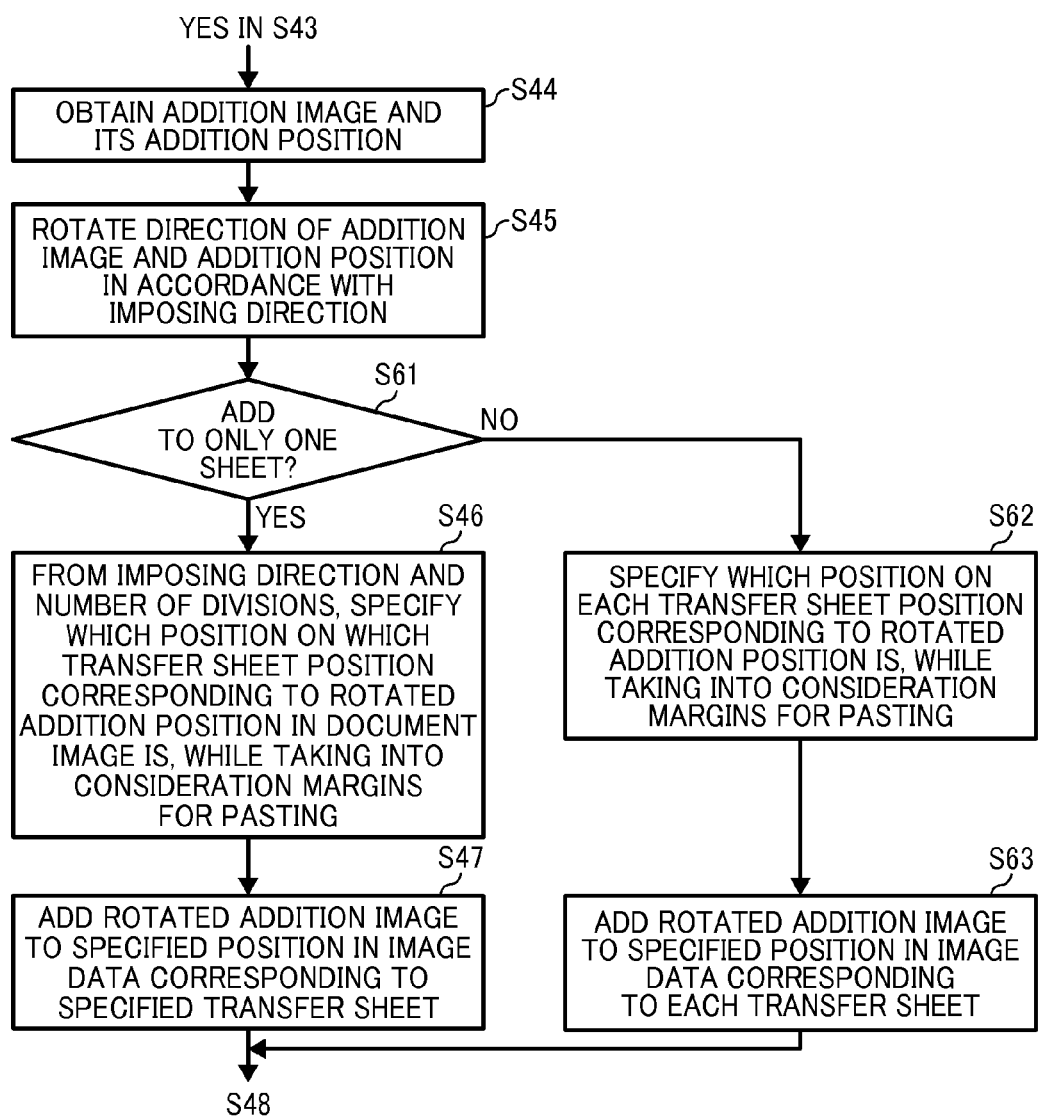
FIG. 11 is a flowchart illustrating an operation that replaces steps S44 to S47 illustrated in FIG. 9, in a second example of the image forming operation.

Next, referring to FIGS. 11 to 15, a second example of the image forming operation executed by the CPU 101 of the MFP 10 will be described. Since this operation is different from the first example only in the point that an operation illustrated in FIG. 11 is executed in place of the operation in steps S44 to S47 illustrated in FIG. 9, only the different portion will be described. The operation illustrated in FIG. 11 takes into consideration settings made by the addition sheet setter 224, and adds an operation in the case of adding the addition image to all sheets to the operation illustrated in FIG. 9. Thus, the following discussion focuses on differences from FIG. 9 that arise from this point.

In the operation illustrated in FIG. 11, after step S45, the CPU 101 determines whether the setting has been made to add the addition image to only one transfer sheet (S61). In the case of only one sheet, the CPU 101 performs the same operation as FIG. 9 (S46 and S47). In contrast, in the case of not only one sheet, the setting has been made to add the addition image to all sheets; thus, the CPU 101 proceeds to step S62 in order to perform the operation in accordance with this setting.

While taking into consideration the margins for pasting, the CPU 101 specifies a position on each transfer sheet, which corresponds to the addition position to which the addition image is added (that may be rotated in step S45) (S62).

Here, using FIG. 12, specification of the addition position, in consideration of margins for pasting, will be described.

Figure 12:
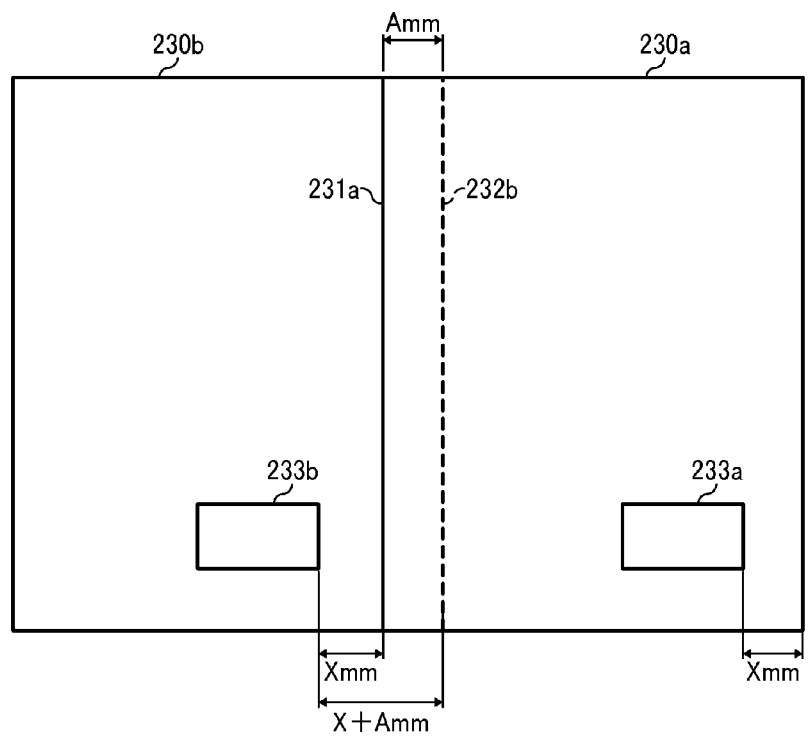
FIG. 12 is a diagram for describing specification of an addition position, in consideration of margins for pasting.

As illustrated in FIG. 12, the following case will be considered in which two transfer sheets 230a and 230b are pasted together in order that the transfer sheet 230a becomes above the transfer sheet 230b. A solid line 231a is the left edge of the transfer sheet 230a, and a broken line 232b is the right edge of the transfer sheet 230b. Since the right edge represented by the broken line 232b is hidden behind the transfer sheet 230a, the right edge of the transfer sheet 230b within a visible range becomes the solid line 231a.

In contrast, as has been described with reference to FIG. 8, the MFP 10 specifies the addition position from the rough position of each transfer sheet and the distance from the sheet edge. Here, the following case will be discussed in which the addition position is in the lower right-hand corner of each transfer sheet and is X mm from the right edge.

Regarding the transfer sheet 230a, if a position that is X mm from the right edge serves as an addition position 233a, the addition image becomes visible at that position even when the transfer sheet 230a is pasted together with the transfer sheet 230b. Therefore, it is only necessary to regard this position, which is X mm from the right edge, as it is as the addition position.

However, regarding the transfer sheet 230b, if a position that is X mm from the right edge serves as an addition position, an A-mm right-edge portion is hidden when the transfer sheet 230b is pasted together with the transfer sheet 230a. A distance from the solid line 231a, which is the apparent paper edge, is only (X−A) mm. If X<A, a portion of the addition image is hidden by the transfer sheet 230a.

In the operation illustrated in FIG. 11, such circumstances are prevented by setting an addition position 233b on the transfer sheet 230b to a position that is X mm from the apparent right edge when the transfer sheet 230b is pasted together with the transfer sheet 230a. When measured from the actual paper edge, this position is at a distance of (X+A) mm, which is the sum of the set distance from the sheet edge and the margin width.

This position is a position corresponding to the addition position on the transfer sheet 230b in the case where a plurality of transfer sheets according to magnification consecutive printing are pasted together. Although FIG. 12 illustrates the settings of the positions in the horizontal direction, the same applies to positions in the vertical direction.

Which transfer sheet serves as the top sheet when transfer sheets are pasted together is determined in advance. Furthermore, for a transfer sheet that serves as the bottom sheet, it is preferable to indicate that that transfer sheet serves as the bottom sheet when pasted with another transfer sheet by adding a line to an image, for example, and it is also preferable to indicate the margin width.

The description returns to FIG. 11.

After step S62, the CPU 101 adds the addition image, which has been rotated in step S45, to the position specified in step S62 for each transfer sheet, in image data corresponding to each transfer sheet (S63). This addition operation can be performed in the same manner as the case of step S29 in FIG. 5 and step S47 except for the addition position.

Thereafter, the operation proceeds to step S48 illustrated in FIG. 9, and the CPU 101 executes image formation on each transfer sheet on the basis of image data generated so far.

According to the above operation, in the case where it has been set to add the addition image to all sheets, the addition image can be added so that the addition image is placed at a position corresponding to the addition position on each recording sheet, while considering the apparent border of each sheet, when a plurality of recording sheets according to magnification consecutive printing are pasted together. Therefore, an image with a natural finish can be obtained even when the magnification consecutive printing function and the image adding function are simultaneously used.

Figure 13:
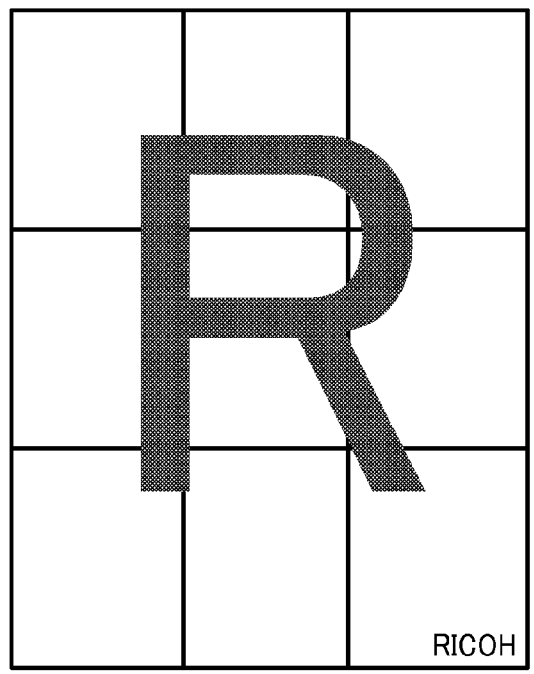
FIG. 13 is a diagram illustrating an exemplary finish obtained by the second example of the image forming operation in the case where the setting has been made to add an addition image to only one transfer sheet.
Figure 14:
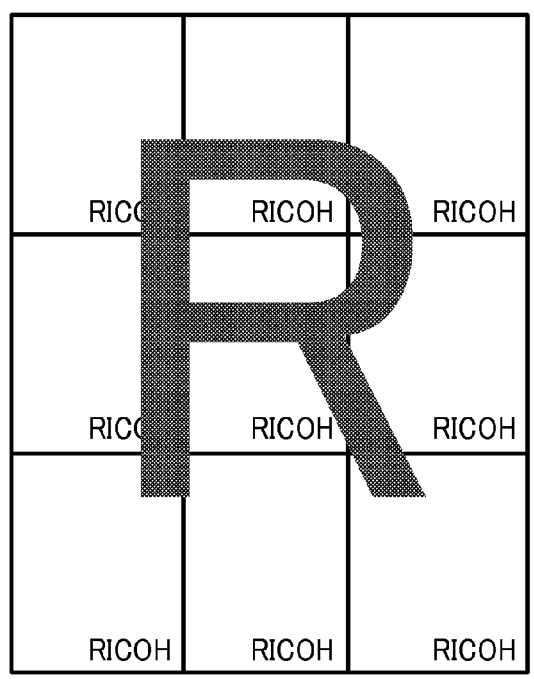
FIG. 14 is a diagram illustrating an exemplary finish obtained by the second example of the image forming operation in the case where the setting has been made to add an addition image to all transfer sheets.

FIG. 13 illustrates an exemplary finish obtained in the case where the setting has been made to add the addition image to only one transfer sheet (an example in a state where transfer sheets, the number of which is the number of division, on which images have been already formed, are pasted together). FIG. 14 illustrates an exemplary finish obtained in the case where the setting has been made to add the addition image to all transfer sheets. In both cases, a natural finish is obtained where the addition image is not hidden behind another transfer sheet when the transfer sheets are pasted together. In the example illustrated in FIG. 14, the addition image is arranged at a certain distance from the apparent border of each transfer sheet when viewed from a side on which an image is formed, and this point also contributes to an appearance with a natural finish.

Figure 15:
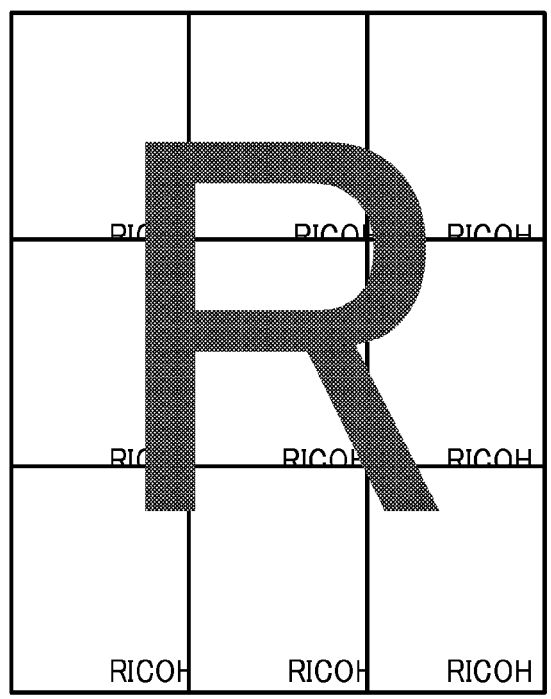
FIG. 15 is a diagram illustrating an exemplary finish corresponding to FIG. 14 according to a comparative example.

A comparative example illustrated in FIG. 15 will be discussed, which illustrates an exemplary finish obtained in the case where the addition image is added at a certain distance from the actual sheet edge of each transfer sheet. In this case, if the distance from the sheet edge is short, the addition image may be hidden behind another transfer sheet when the transfer sheets are pasted together. In addition, the distance from the apparent border of each transfer sheet to the addition image becomes different, resulting in an unnatural finish. Such circumstances can be prevented by executing the operation illustrated in FIG. 11.

Next, referring to FIGS. 16 and 17, a third example of the image forming operation executed by the CPU 101 of the MFP 10 will be described. Since this operation is different from the second example only in the point that an operation illustrated in FIG. 16 is executed as an addition image adding operation in steps S47 and S63 in FIG. 11, only the different portion will be described.

Figure 16:
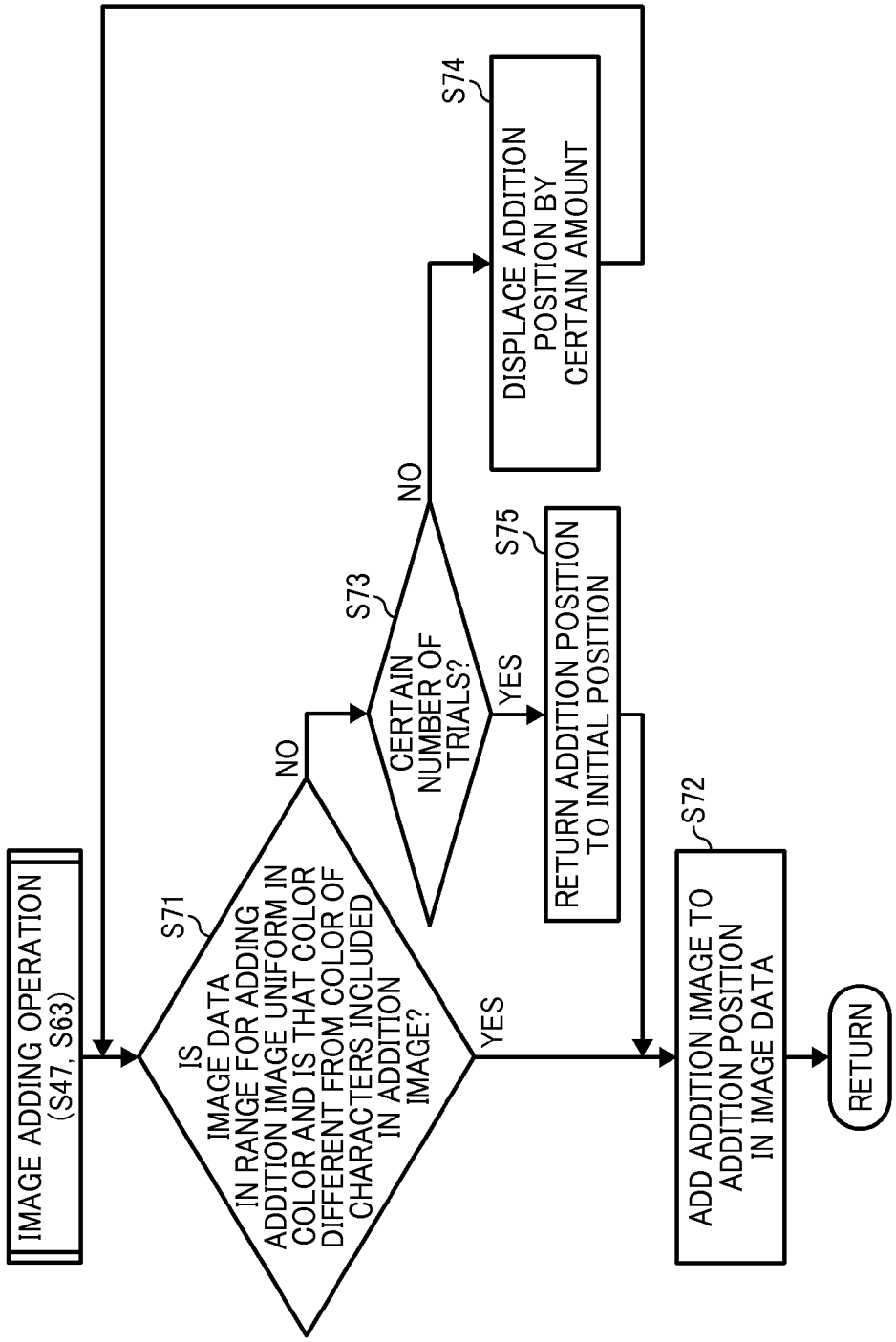
FIG. 16 is a flowchart of an operation executed in steps S47 and S63 illustrated in FIG. 11, in a third example of the image forming operation.

The operation illustrated in FIG. 16 is, in adding the addition image to image data corresponding to one transfer sheet, an operation of adding the addition image while adjusting the addition position in order that the addition image does not overlap a character or the like in the image data of the addition destination. Like step S63, when the addition image is added to image data corresponding to a plurality of transfer sheets, the operation illustrated in FIG. 16 is executed for every transfer sheet.

In the operation illustrated in FIG. 16, the CPU 101 first determines whether image data in a range for adding the addition image is uniform in color and whether that color is different from the color of characters included in the addition image (S71). A range for adding the addition image includes a position for arranging the addition image on the basis of the addition position determined in step S46 or S62 illustrated in FIG. 11. When image data in this range is uniform in color, it can be considered that the range is a background portion and is thus appropriate for adding an image. Comparison with the color of characters included in the addition image is done because when the background color is the same as the color of the characters, the characters are unrecognizable even when the image is added to that portion.

In the case where the addition image has a plurality of colors, the determination may be YES when the background color is different from all of these colors. Alternatively, in the case where the addition image has many colors, because there is only little influence even if one of these colors is the background color, the color comparison step may be omitted.

In the case of YES in step S71, the CPU 101 determines that there is no problem in adding the addition image to the current addition position, adds the addition image (S72), and returns to the original operation.

In contrast, in the case of NO in step S71, the CPU 101 repeats the determination in step S71 while shifting the addition position by a certain amount (S74) until the number of trials reaches a certain number (S73). That is, the CPU 101 shifts the addition position little by little and searches for a position appropriate for adding the addition image. The shifting direction and distance may be arbitrarily set.

In the case where the determination in step S71 becomes YES within the certain number of trials, the CPU 101 adds the addition image to the addition position at that point of time (S72). When the determination in step S71 does not become YES even after the certain number of trials, the CPU 101 determines that no appropriate addition position has been found. The CPU 101 changes the addition position to the original value (at the start of the operation illustrated in FIG. 16) (S75), and adds the addition image to that addition position (S72).

According to the above operation, the addition image can be arranged at a position that becomes a background such that the addition image does not overlap characters or the like included in an image of the addition destination. Therefore, the addition image can be made more visible.

Figure 17:
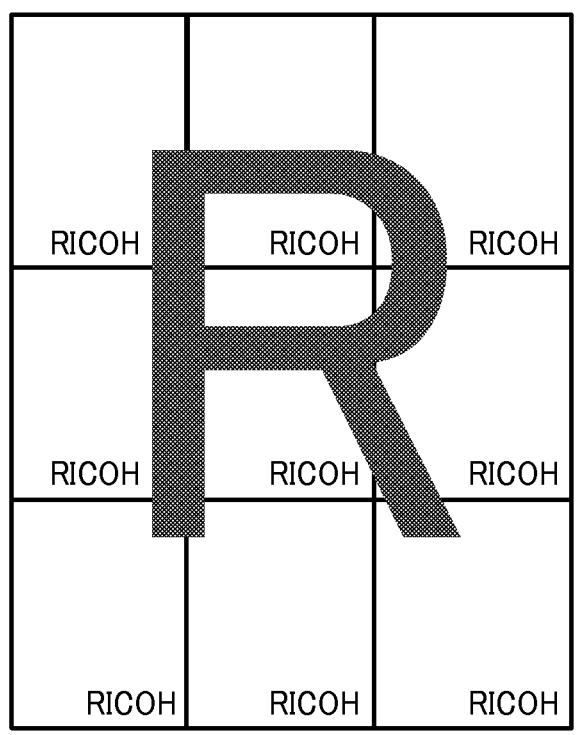
FIG. 17 is a diagram illustrating an exemplary finish obtained by the third example of the image forming operation.

FIG. 17 illustrates an exemplary finish obtained in the case where the addition image is added by the operation illustrated in FIG. 16. In comparison with the example illustrated in FIG. 14, the character string "RICOH" included in the addition image can be arranged so as not to overlap the character "R" in an image obtained by reading a document, and the addition image has an easily viewable finish.

Next, referring to FIGS. 18 and 19, a fourth example of the image forming operation executed by the CPU 101 of the MFP 10 will be described. Since this operation is different from the first and second examples only in the point that an operation illustrated in FIG. 18 is executed in place of the operation in steps S44 to S47 illustrated in FIG. 9, only the different portion will be described.

The fourth example assumes the case in which, besides the settings described using FIG. 8, the setting of forced addition of adding a particular addition image to all transfer sheets can be made as a setting regarding the image adding function. The forced addition setting may be made by the user in person who wants to perform image formation. Alternatively, the administrative setting may be made in the MFP 10 so that a general user cannot change the setting, the setting may be made as a property of a saved file, or the setting may be made in the case where a particular pattern is detected in a read image.

Figure 18:
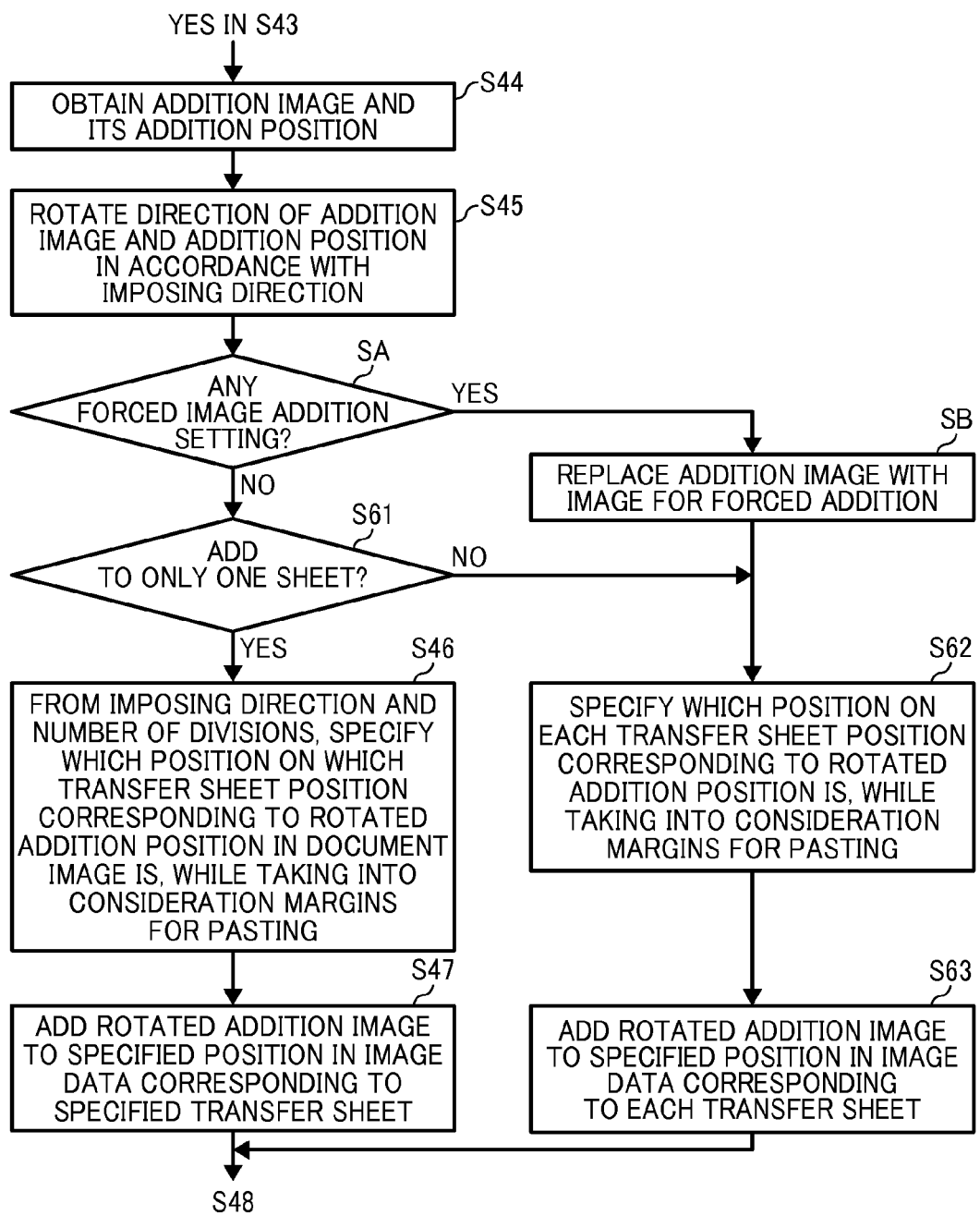
FIG. 18 is a flowchart illustrating an operation that replaces steps S44 to S47 illustrated in FIG. 9, in a fourth example of the image forming operation.

Taking the forced addition setting into consideration, the operation illustrated in FIG. 18 further adds the operation in the case of executing forced addition to the operation illustrated in FIG. 11. Thus, the following discussion focuses on differences from FIG. 11 that arise from this point.

In the operation illustrated in FIG. 18, after step S45, the CPU 101 obtains information regarding the forced addition setting, and determines whether the forced addition setting has been made (SA). In the operation in step SA, the CPU 101 functions as a forced setting obtainer.

In the case of YES in step SA, the CPU 101 replaces the addition image obtained in step S44 performed with an image for forced addition (SB). Here, it is preferable to reflect he rotation in step S45. The addition position follows the user setting. That is, the addition position rotated in step S45 is maintained as it is. Like the case of adding an image to all transfer sheets, the operation from step S62 onward is executed.

In contrast, in the case of NO in step SA, the operation proceeds to step S61, and the operation thereafter is the same as FIG. 11.

According to the above operation, in accordance with the forced addition setting, an output obtained by adding a particular image to all transfer sheets can have a finish that the particular image will not be hidden even when the transfer sheets are pasted together. It can be considered that the forced addition setting is used to indicate that an output is a duplicate or to indicate the right holder of the duplicate. In such cases, inconvenience is caused when an added image is hidden. Therefore, it is useful when an image can be added without being hidden, as described above.

Figure 19:
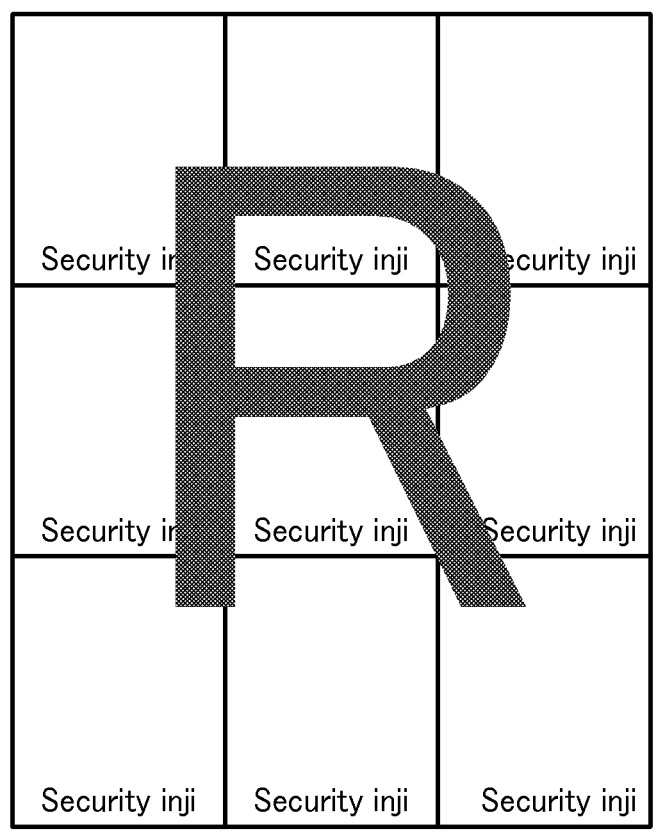
FIG. 19 is a diagram illustrating an exemplary finish obtained by the fourth example of the image forming operation.

FIG. 19 illustrates an exemplary finish obtained in the case where the addition image is added by the operation illustrated in FIG. 18. In comparison with the example illustrated in FIG. 17, the finish is such that the character string "Security inji" for forced addition is arranged on all transfer sheets and the point that the output has been subjected to forced addition processing is strikingly indicated.

Figure 20:
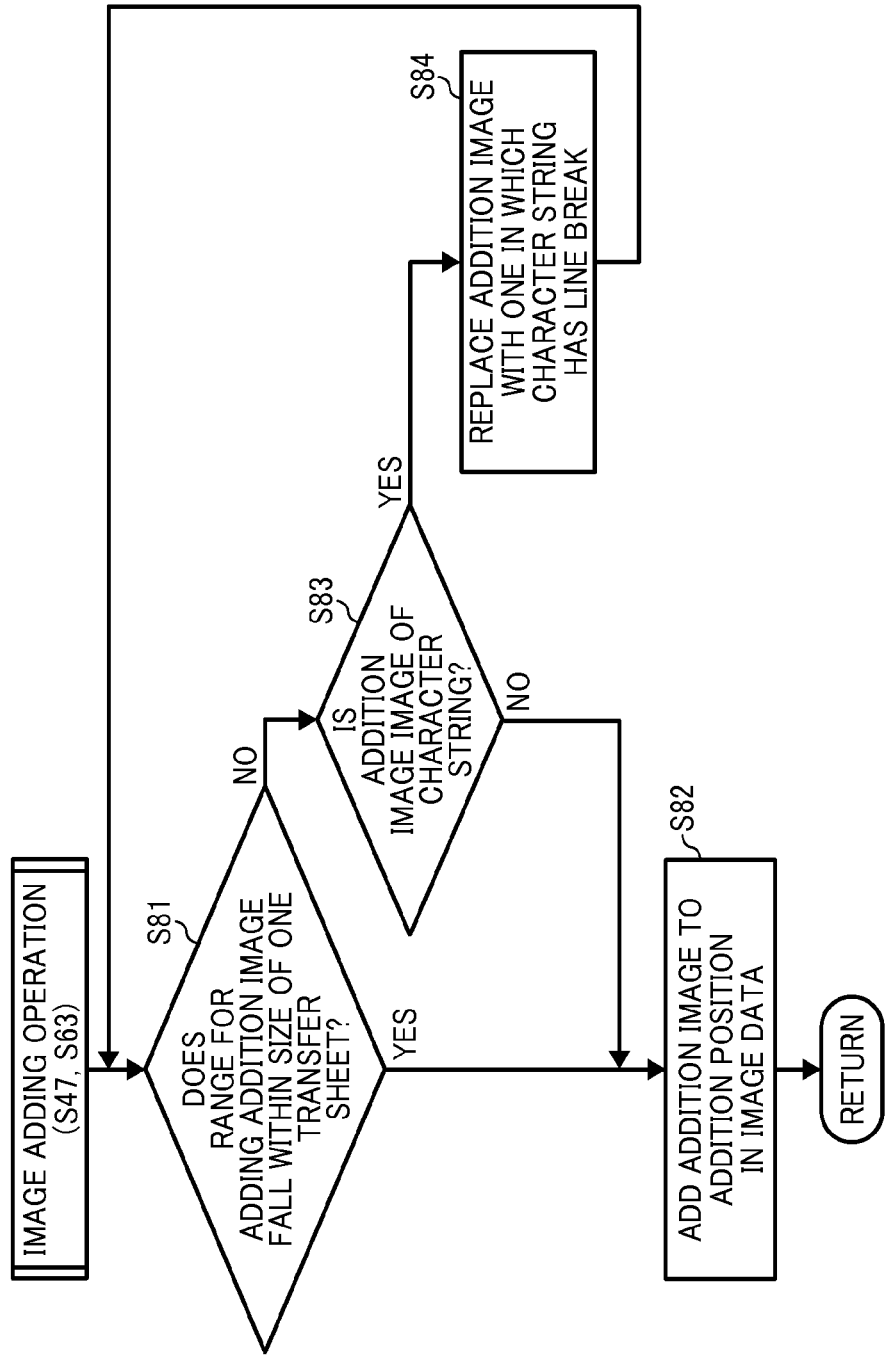
FIG. 20 is a flowchart illustrating an operation that replaces the operation illustrated in FIG. 16, in a fifth example of the image forming operation.

Next, referring to FIGS. 20 to 22, a fifth example of the image forming operation executed by the CPU 101 of the MFP 10 will be described. Since this operation is different from the third example only in the point that an operation illustrated in FIG. 20 is executed in place of the operation illustrated in FIG. 16, only the different portion will be described. The fifth example discusses the case in which, if an addition image is an image of a character string and the character string does not fit into one transfer sheet, an image obtained by inserting a line break into the character string so that the character string fits into one transfer sheet is added.

In the operation illustrated in FIG. 20, the CPU 101 first determines whether a range for adding the addition image falls within the size of one transfer sheet (S81). If the determination is YES, there is no problem. The CPU 101 simply adds the addition image to the addition position in the image data (S82), and returns to the original operation. In contrast, in the case of NO in step S81 and the addition image is an image of a character string (S83), the CPU 101 replaces the addition image with one in which the character string has a line break (S84). The position of a line break may be automatically determined in accordance with an appropriate algorithm. For example, it is conceivable to separate the character string into equal portions or to separate the character string into the width of one transfer sheet. Alternatively, the position of a line break may be set by paying attention to the space between words.

In any case, after step S84, the CPU 101 returns to step S81 and repeats the operation until the determination becomes YES in step S81. If the determination becomes YES, the addition image at that point of time is used and added in step S82.

In the case of NO in step S83, the addition image does not fit into one transfer sheet even when a line break is added to the addition image; therefore, the addition image is added as it is in step S82. In this case, part of the addition image will not be visible, but this is regarded as inevitable and is accepted.

According to the above operation, in the case where an addition image is a character string, the addition image can be added without spanning across a plurality of transfer sheets. If the addition image spans across a plurality of transfer sheets, positional displacement may occur when the transfer sheets are pasted together, resulting in an unnatural finish. Such circumstances can be prevented by the operation illustrated in FIG. 20.

Figure 21:
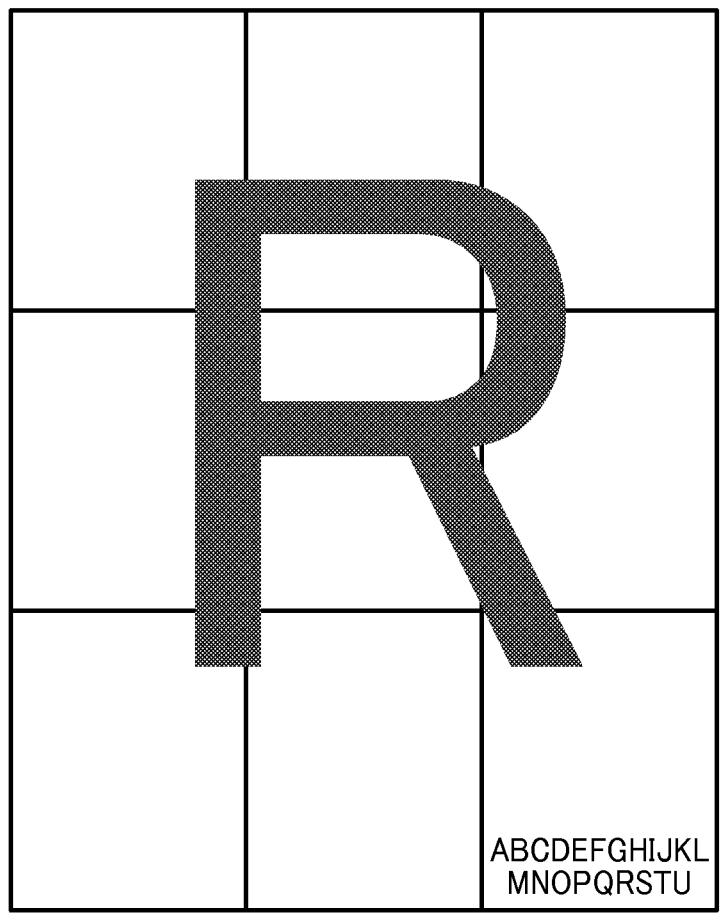
FIG. 21 is a diagram illustrating an exemplary finish obtained by the fifth example of the image forming operation.

FIG. 21 illustrates an exemplary finish obtained in the case where the addition image is added by the operation illustrated in FIG. 20. In the example illustrated in FIG. 21, in the case of adding a long character string in the lower right-hand corner of an image, a line break is automatically inserted and the entire character string fits into in one transfer sheet.

Figure 22:
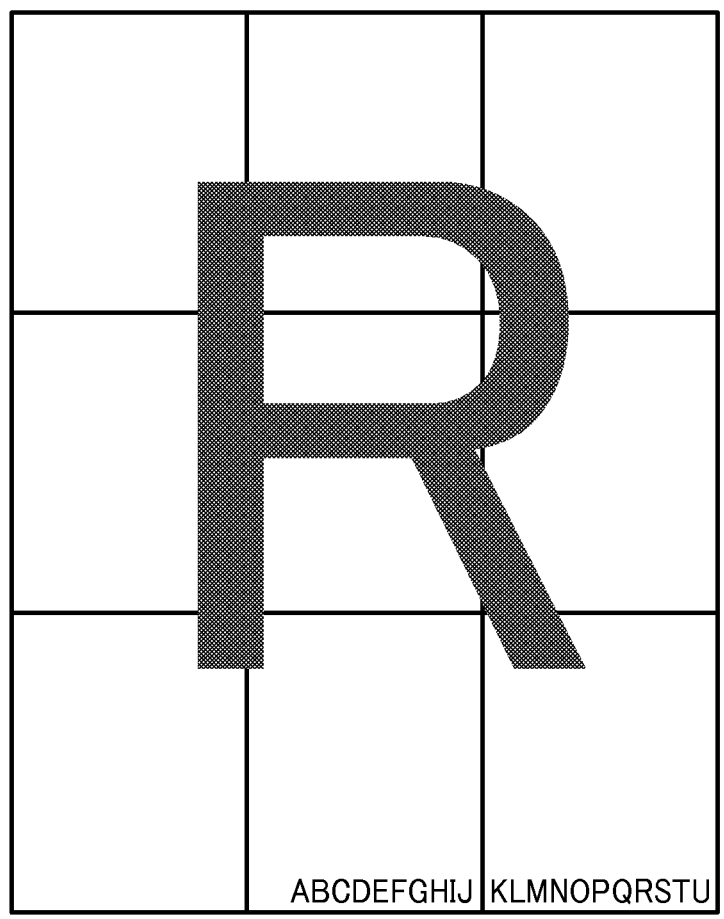
FIG. 22 is a diagram illustrating an exemplary finish obtained by a modification of the fifth example of the image forming operation.

In the case where the addition image does not fit into one transfer sheet, the character string may be purposely separated and formed on two transfer sheets, as illustrated in FIG. 22. In this case, in the case of NO in step S81 in FIG. 20, only a portion of the addition image that is in a range that falls within the area of a transfer sheet being processed is added in step S82. Thereafter, only the remaining portion serves as an addition image, and, it is only necessary to execute, for the adjacent transfer sheet, the operation illustrated in FIG. 20 again. In this case, it is assumed that the addition position is displaced by the amount of a margin for pasting, as has been described using FIG. 12.

Next, referring to FIG. 23, a sixth example of the image forming operation executed by the CPU 101 of the MFP 10 will be described. Since this operation is different from the third example only in the point that an operation illustrated in FIG. 23 is executed in place of the operation illustrated in FIG. 16, only the different portion will be described. The sixth example discusses the case in which, when the addition image does not fit into one transfer sheet, the image formation itself is canceled.

In the operation illustrated in FIG. 23, like the case illustrated in FIG. 20, the CPU 101 first determines whether a range for adding the addition image falls within the size of one transfer sheet (S81). If the determination is YES, the CPU 101 adds the addition image to the addition position in the image data (S82), and returns to the original operation. However, if the determination is NO, the CPU 101 cancels the image formation, notifies the user thereof (S85), and ends the operation as it is.

According to the above operation, if the addition image spans across a plurality of transfer sheets, the image formation itself can be canceled. By canceling the image formation itself in the case where inconvenience is caused when the addition image spans across a plurality of transfer sheets, useless supply and uselessly spending time can be prevented.

Specific configurations of the apparatus, specific procedures of the operations, data configurations, the number of sheets for magnification consecutive printing, the order of arranging transfer sheets, the details of the addition image, and how the addition position is defined are not limited to those described in the embodiment.

For example, in the case of using the magnification consecutive printing function and the image adding function in combination, the addition image may be magnified and then added in accordance with the image magnification factor. In this case, not only the addition image is simply magnified as an image, but also the addition image can be substantially magnified by adjusting the font size when the addition image is an image according to a character string.

For example, as illustrated in FIG. 24, it is conceivable to set in the MFP 10 magnification factors and font sizes that are associatively related, and to generate an addition image from a character string using a font size that corresponds to the magnification factor calculated in step S13 in FIG. 2.

Needless to say, the addition image is not limited to an image of a character string, and may be a prepared image of image data such as a bitmap image.

The invention is applicable not only to an image forming apparatus and an image forming system, but also to an image forming apparatus and an image forming system that simply process an image and that are provided simply for image formation in an image forming apparatus and an image forming system.

In addition, the following case is not precluded in which the image processing function of the above-mentioned MFP 10 is separated and provided in a plurality of apparatuses, and these apparatuses cooperate to implement the image processing function. In this case, these apparatuses configure an image processing system.

For example, the MFP 10 may receive a user instruction for printing an image on a plurality of recording sheets with an addition image added, and sends such instruction to an image processing apparatus functioning as a server. The server analyzes the user instruction to generate image data to be printed according to various settings of the user instruction, and sends such image data for printing to the MFP 10.

An embodiment of a program according to the present invention is a program for causing a computer to control hardware components and to implement the functions (particularly the magnification consecutive printing function and the image adding function) of the MFP 10 according to the above-described embodiment.

The program may be stored in advance in a built-in ROM of a computer, or in another non-volatile storage medium (such as a flash memory or an electrically erasable programmable read-only memory (EEPROM)). Alternatively, the program may be recorded in an arbitrary non-volatile recording medium such as a memory card, a compact disc (CD), a digital versatile disc (DVD), or a Blue-ray disc, and provided. By installing the program, recorded in such a recording medium, in a computer and executing the program, the above-described procedures can be executed.

Furthermore, the program can be downloaded from an external apparatus that is connected to a network and that includes a recording medium having recorded thereon the program or a memory having stored thereon the program, and then the program can be installed in a computer and executed.

Although the present invention made by the inventor of the present invention has been specifically described on the basis of the preferred exemplary embodiment as above, the present invention is not limited to those described in the above embodiment, and needless to say, various changes can be made without departing from the scope thereof.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:

1. An image processing system, comprising:
a display device including a graphic user interface (GUI) configured to interact with a user; and
an image processing apparatus including a memory having computer readable instructions stored thereon, and one or more processors configured to execute the computer readable instructions to,
receive an instruction from the user via the GUI, the instruction instructing the image processing apparatus to print a first image and a second image on a plurality of recording sheets such that the second image is printed at a first position on at least one of the plurality of recording sheets, the first image being different from the second image,
generate a plurality of image data by dividing the first image into a number of divisions as specified by the user, each of the plurality of image data configured to be formed on a respective one of the plurality of recording sheets such that the first image is re-creatable by arranging the plurality of recording sheets in a desired configuration,
determine a first recording sheet of the plurality of recording sheets and a desired position on the first recording sheet based on (i) the first position of the second image, (ii) the number of divisions of the first image corresponding to the plurality of recording sheets on which the first image is formed, and (iii) an image forming direction for forming the plurality of image data on the plurality of recording sheets,
add the second image and one of the plurality of image data on the desired position of the first recording sheet,
rotate the second image and the one of the plurality of image data to be added to the first recording sheet according to the image forming direction, and
determine the first recording sheet and the desired position on the first recording sheet based on an amount that the second image and the one of the plurality of image data is rotated.

2. The image processing system of claim 1, wherein the one or more processors are further configured to execute the computer readable instructions to,
add the second image to the desired position on the first recording sheet that corresponds to an area other than a margin for pasting on the first recording sheet.

3. The image processing system of claim 1, wherein the one or more processors are further configured to execute the computer readable instructions to,
determine the desired position on each one of the plurality of recording sheets for adding the second image based on the image forming direction, if the instruction indicates to add the second image to all of the plurality of recording sheets.

4. The image processing system of claim 1, wherein if a forced addition setting is set the one or more processors are further configured to execute the computer readable instructions to,
determine the desired position on each one of the plurality of recording sheets irrespective of the instruction from the user, and
add the second image to the desired position on each of the plurality of recording sheets.

5. The image processing system of claim 1, wherein the one or more processors are further configured to execute the computer readable instructions to replace the second image with a third image, if a width of a first character string of the second image is larger than a width of one of the plurality of recording sheets, and
the third image includes a second character string with an inserted line break such that a width of the second character string is equal to a width of one of the plurality of recording sheets.

6. The image processing system of claim 5, wherein the one or more processors are further configured to execute the computer readable instructions to,
generate information that indicates cancelling an image formation by the image processing apparatus in response to the instruction from the user, if the width of the first character string is larger than the width of one of the plurality of recording sheets.

7. The image processing system of claim 1, further comprising:
an image forming device configured to,
form the first image on the plurality of recording sheets based on the plurality of image data such that each of the plurality of image data is formed on a respective one of the plurality of recording sheets, and
form the second image on at least one of the plurality of recording sheets.

8. An image processing apparatus, comprising:
a memory having computer readable instructions stored thereon; and
one or more processors configured to execute the computer readable instructions to,
receive an instruction from the user via a graphic user interface (GUI), the instruction instructing the image processing apparatus to print a first image and a second image on a plurality of recording sheets such that the second image is printed at a first position on at least one of the plurality of recording sheets, the first image different from the second image,
generate a plurality of image data by dividing the first image into a number of divisions as specified by the user, each of the plurality of image data configured to be formed on a respective one of the plurality of recording sheets such that the first image is re-creatable by arranging the plurality of recording sheets in a desired configuration,
determine a first recording sheet of the plurality of recording sheets and a desired position on the first recording sheet based on (i) the first position of the second image, (ii) the number of divisions of the first image corresponding to the plurality of recording sheets on which the first image is formed, and (iii) an image forming direction for forming the plurality of image data on the plurality of recording sheets,
add the second image and one of the plurality of image data on the desired position of the first recording sheets,
rotate the second image and the one of the plurality of image data to be added to the first recording sheet according to the image forming direction, and
determine the first recording sheet and the desired position on the first recording sheet based on an amount that the second image and the one of the plurality of image data is rotated.

9. The image processing apparatus of claim 8, wherein the one or more processors are further configured to execute the computer readable instructions to,
add the second image to the desired position on the first recording sheet that corresponds to an area other than a margin for pasting on the first recording sheet.

10. The image processing apparatus of claim 8, wherein the one or more processors are further configured to execute the computer readable instructions to,
    determine the desired position on each one of the plurality of recording sheets for adding the second image based on the image forming direction if the instruction indicates to add the second image to all of the plurality of recording sheets.

11. The image processing apparatus of claim 8, wherein if a forced addition setting is set the one or more processors are further configured to execute the computer readable instructions to,
    determine the desired position on each one of the plurality of recording sheets irrespective of the instruction from the user, and
    add the second image to the desired position on each one of the plurality of recording sheets.

12. The image processing apparatus of claim 8, wherein the one or more processors are further configured to execute the computer readable instructions to,
    replace the second image with a third image, if a width of a first character string of the second image is larger than a width of one of the plurality of recording sheets, and the third image includes a second character string with an inserted line break such that a width of the second character string is equal to a width the plurality of recording sheets.

13. The image processing apparatus of claim 8, further comprising:
    an image forming device configured to,
        form the first image on the plurality of recording sheets based on the plurality of image data such that each of the plurality of image data is formed on a respective one of the plurality of recording sheets, and
        form the second image on at least one of the plurality of recording sheets.

14. An image processing method, comprising:
    receiving an instruction from a user via a graphical user interface (GUI), the instruction instructing an image processing apparatus to print a first image and a second image on a plurality of recording sheets such that the second image is printed at a first position on at least one of the plurality of recording sheets, the first image being different from the second image;
    generating a plurality of image data by dividing the first image into a number of divisions as specified by the user, each of the plurality of image data configured to be formed on a respective one of the plurality of recording sheets such that the first image is re-creatable by arranging the plurality of recording sheets in a desired configuration;
    determining a first recording sheet of the plurality of recording sheets and a desired position on the first recording sheet based on (i) the first position of the second image, (ii) a number of divisions of the first image corresponding to the plurality of recording sheets on which the first image is formed, and (iii) an image forming direction for forming the plurality of image data on the plurality of recording sheets;
    adding the second image and one of the plurality of image data on the desired position of the first recording sheet;
    rotating the second image and the one of the plurality of image data to be added to the first recording sheet according to the image forming direction; and
    determining the first recording sheet and the desired position on the first recording sheet based on the rotation.

15. The image processing method of claim 14, further comprising:
    determining the desired position on each one of the plurality of recording sheets for adding the second image based on the image forming direction, if the instruction indicates to add the second image to all of the plurality of recording sheets.

16. The image processing method of claim 14, further comprising:
    determining the desired position on each one of the plurality of recording sheets irrespective of the instruction from the user if a forced addition setting is set; and
    adding the second image to the desired position on each one of the plurality of recording sheets if the forced addition setting is set.

17. The image processing method of claim 14, further comprising:
    replacing the second image with a third image, if a width of a first character string of the second image is larger than a width of one of the plurality of recording sheets, the third image includes a second character string with an inserted line break such that a width of the second character string is equal to a width of one of the plurality of recording sheets.

* * * * *